(12) United States Patent
Suzuki

(10) Patent No.: US 11,487,809 B2
(45) Date of Patent: Nov. 1, 2022

(54) INFORMATION PROVISION DEVICE AND INFORMATION PROVISION METHOD THEREFOR

(71) Applicant: TOSHIBA TEC KABUSHIKI KAISHA, Tokyo (JP)

(72) Inventor: Kota Suzuki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 654 days.

(21) Appl. No.: 16/506,725

(22) Filed: Jul. 9, 2019

(65) Prior Publication Data
US 2020/0142924 A1 May 7, 2020

(30) Foreign Application Priority Data
Nov. 7, 2018 (JP) .............................. JP2018-209696

(51) Int. Cl.
| G06F 16/583 | (2019.01) |
| G06F 16/55 | (2019.01) |
| G06T 7/70 | (2017.01) |
| H04N 5/247 | (2006.01) |
| G06V 40/16 | (2022.01) |

(52) U.S. Cl.
CPC .......... *G06F 16/583* (2019.01); *G06F 16/55* (2019.01); *G06T 7/70* (2017.01); *G06V 40/172* (2022.01); *H04N 5/247* (2013.01); *G06T 2207/30201* (2013.01)

(58) Field of Classification Search
CPC .............................. G06F 16/583; G06F 16/55
USPC ......................................................... 707/705
See application file for complete search history.

(56) References Cited

U.S. PATENT DOCUMENTS

| 11,107,145 | B2* | 8/2021 | Li ....................... G06Q 30/0633 |
| 2019/0163985 | A1* | 5/2019 | Wang ................. G06Q 30/0631 |
| 2019/0318417 | A1* | 10/2019 | Gumaru ............. G06Q 30/0635 |
| 2020/0034812 | A1* | 1/2020 | Nemati ................ G06Q 20/201 |

FOREIGN PATENT DOCUMENTS

| JP | 2010009566 A | 1/2010 |
| JP | 3931541 B2 | 6/2012 |
| JP | 2012185576 A | 9/2012 |

* cited by examiner

*Primary Examiner* — Kimberly L Wilson
(74) *Attorney, Agent, or Firm* — Kim & Stewart LLP

(57) ABSTRACT

According to an embodiment, an information provision device has a plurality of cameras and a processor. The processor identifies a person included in an image acquired by the camera from the image. The processor identifies a place photographed by the camera from the image obtained by the camera. The processor identifies an information terminal used by the person from the image obtained by the camera. The processor provides information according to the identified place to the identified information terminal.

6 Claims, 16 Drawing Sheets

INFORMATION PROVISION DEVICE AND INFORMATION PROVISION METHOD THEREFOR

CROSS-REFERENCE TO RELATED APPLICATION

This application is based upon and claims the benefit of priority from the prior Japanese Patent Application No. 2018-209696, filed on Nov. 7, 2018, the entire contents of which are incorporated herein by reference.

FIELD

Embodiments described herein relate generally to an information provision device and an information provision method therefor.

BACKGROUND

A system for providing information regarding a product sales floor to customers on the product sales floor and supporting the purchasing behaviors of these customers is proposed. These types of many conventional systems track the customers moving through the sales floor in real time. Further, if the customers come to a predetermined sales floor, the conventional system provides information related to the sales floor to terminals used by the customers. Here, as a method of tracking the customers, a method using wireless positioning technology such as a global positioning system (GPS) and beacons is known.

However, when the GPS is adopted, an indoor application is difficult, and even if the indoor application is enabled, positioning accuracy is poor. Further, even when the beacon system is adopted, in order to increase the positioning accuracy, it is necessary to arrange communication devices for the beacons at a high density in a store. As described above, tracking the behavior of the person causes various problems that should be solved.

DETAILED DESCRIPTION

Figure 1:
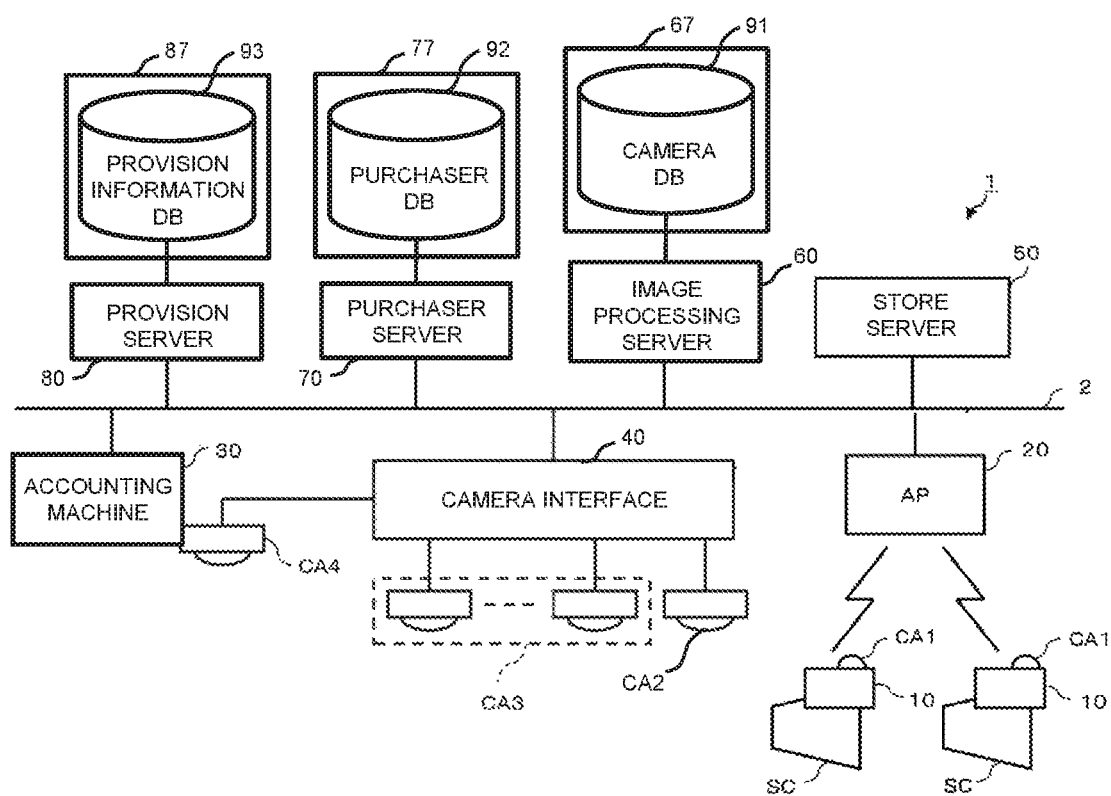
FIG. 1 is an entire configuration diagram of a store system to which an information provision device according to an embodiment is applied.

According to an embodiment, an information provision device has a plurality of cameras, a communication interface, a storage device, and a processor. The plurality of cameras obtains images by photographing a predetermined photographing region including a person. The communication interface communicates with the plurality of cameras and an information terminal used by the person. The storage device stores a person database and an information provision database. The person database stores a person record for identifying the person included in the images obtained by the plurality of cameras. The information provision database previously stores an information record including provision information to be provided to the person, according to position information indicating an installation position of a predetermined camera among the plurality of cameras. When the image obtained by any camera among the plurality of cameras is received via the communication interface, the processor generates the person record including a face image of the person acquired on the basis of the received image and terminal identification information for identifying the information terminal used by the person acquired on the basis of the received image and stores the generated person record in the person database. When the image obtained by the predetermined camera is received via the communication interface, the processor reads the person record including the face image of the person acquired on the basis of the received image from the person database. Further, the processor reads the information record according to the position information indicating the installation position of the predetermined camera generated on the basis of the received image from the information provision database. Further, the processor transmits the provision information included in the read information record to the information terminal identified by the terminal identification information included in the read person record via the communication interface.

Hereinafter, an information provision device according to an embodiment will be described using the drawings. The information provision device according to the embodiment can provide information related to a place where a person is located via a terminal used by the person, without tracking the behavior of the person. In the drawings, the same reference numerals indicate the same or similar parts.

In addition, the present embodiment provides, to a person who performs shopping using a shopping cart in a retail store such as a supermarket, information related to a sales floor where the person is located via an information terminal provided in the shopping cart. In the following description, the person who performs shopping is called a purchaser. The shopping cart is simply called a cart.

First Embodiment

FIG. 1 is a diagram showing an entire configuration of a store system 1 according to an embodiment. The information provision device according to the embodiment is applied to the store system 1 and the store system 1 is constructed in a store. The store system 1 (information provision device) includes information terminals 10, an access point 20, an accounting machine 30, a camera interface 40, a store server 50, an image processing server 60, a purchaser server 70, and a provision server 80. Further, the store system 1 includes a network 2. The network 2 connects the access point 20, the accounting machine 30, the camera interface 40, the store server 50, the image processing server 60, the purchaser server 70, and the provision server 80 to communicate with each other. The network 2 is a local area network (LAN), for example.

An information terminal 10 is a device that enables a purchaser to directly input data regarding registration of purchase products. The information terminal 10 is provided for each cart SC. The cart SC is an example of a mobile object that carries the purchase products of the purchaser who is a user of the cart SC.

The information terminal 10 has a wireless unit. The information terminal 10 performs wireless communication with the access point 20 using the wireless unit. The access point 20 relays communication between each device connected to the network 2, for example, the accounting machine 30, the store server 50, the image processing server 60, the purchaser server 70, or the provision server 80 and the information terminal 10. Although only one access point 20 is shown in FIG. 1, two or more access points may be provided depending on a size of the store or the like.

The information terminal 10 has a camera CA1 (mobile camera) to be one of photographing mechanisms. The camera CA1 photographs a predetermined photographing region including a purchaser (person) who uses the cart SC provided with the information terminal 10 and obtains an image. Specifically, the camera CA1 is attached to the cart SC so that at least a face of the purchaser using the information terminal 10 can be photographed. Here, the camera CA1 functions as a mobile object photographing mechanism. In the following description, the camera CA1 is referred to as a cart camera CA1.

The accounting machine 30 is a device that enables a clerk or a purchaser to perform accounting of the purchase products. The accounting machine 30 is a known self-type point of sale (POS) terminal. The accounting machine 30 may be a known facing-type POS terminal. The number of accounting machines 30 is not particularly limited.

The camera interface 40 takes image data obtained by photographing by cameras provided in the store, which function as photographing mechanisms different from the cart camera CA1. The cameras different from the cart camera CA1 include a store entrance camera CA2, base cameras CA3, and an accounting camera CA4, for example.

The store entrance camera CA2 obtains an image by photographing a predetermined photographing region including a purchaser (person) who enters the store. Specifically, the store entrance camera CA2 is installed at a position where it is possible to photograph at least a face of the purchaser in the store. The store entrance cameras CA2 are installed by the number of store entrances, for example.

The base camera CA3 obtains an image by photographing a predetermined photographing region including a purchaser (person) who has come to a sales floor base. The base is a place where there is information to be provided to the purchaser. For example, when information regarding bargains is provided to a purchaser who has come in front of a product shelf on which the bargains have been displayed, a floor surface in front of the product shelf on which the bargains have been displayed becomes the base. For example, when information for introducing a recommended recipe is provided to a purchaser who has come in front of the product shelf on which products to be ingredients of the recipe have been displayed, a floor surface in front of the product shelf on which the products to be the ingredients have been displayed becomes the base. The base camera CA3 is installed at a position where it is possible to photograph at least the face of the purchaser who has come to the base in the store. The base cameras CA3 are installed by the number of bases, for example.

The accounting camera CA4 obtains an image by photographing a predetermined photographing region including a purchaser (person) who performs accounting of the purchase products by the accounting machine 30. Specifically, the accounting camera CA4 is installed at a position where it is possible to photograph at least the face of the purchaser who performs accounting in the store. The accounting cameras CA4 are installed by the number of accounting machines 30, for example.

The store server 50 is a computer device specialized for supporting a store business. The store server 50 has a product database, a sales database, and the like. These databases may be stored in a storage device built in the store server 50. Further, these databases may also be stored in a storage device externally attached to the store server 50. The product database is a collection of product records describing product data for each product sold in the store. The product data includes a product code, a price, a product name, and the like. The product code is identification data of the product. The sales database is a collection of sales records in which data (sales data) regarding sales has been described for each item such as product, department, time zone, date, week, and month. The sales data includes sales points, sales amounts, and the like.

The image processing server 60 is a computer device specialized for processing images (image data) obtained by photographing by the photographing mechanisms, that is, the cart camera CA1, the store entrance camera CA2, the base camera CA3, and the accounting camera CA4. The image processing server 60 has a camera database 91. The camera database 91 is a collection of camera records 91R created for each of the cameras CA1, CA2, CA3, and CA4. The camera database 91 is stored in the storage device 67. The storage device 67 may be built in the image processing server 60. That is, the camera database 91 may be stored in the storage device built in the image processing server 60. Further, the storage device 67 may be externally attached to the image processing server 60. That is, the camera database 91 may be stored in the storage device 67 externally attached to the image processing server 60. Further, the storage device 67 may be provided in another server that can communicate with the image processing server 60. That is, the camera database 91 may be stored in a storage device 67 of another server that can communicate with the image processing server 60. In the following description, the collection of camera records 91R and the storage device 67 storing the collection are collectively referred to as the camera database 91.

Figure 2:
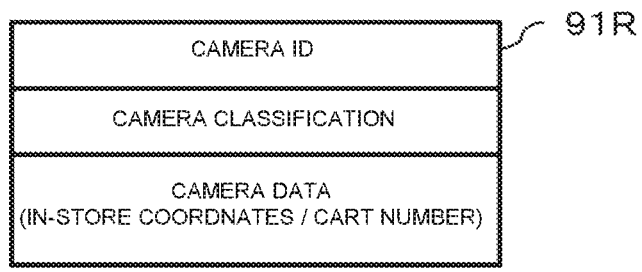
FIG. 2 is a schematic diagram showing a data configuration of a camera record according to the embodiment.

FIG. 2 is a schematic diagram showing a data configuration of the camera record 91R. As shown in FIG. 2, the camera record 91R includes a camera ID, a camera classification, and camera data. The camera ID is unique identification data set for each camera to individually identify each of the cameras CA1, CA2, CA3, and CA4. Each of the cameras CA1, CA2, CA3, and CA4 stores a camera ID set to the own device, and outputs the image data together with the camera ID at the time of outputting the image data obtained by photographing.

The camera classification of the camera record 91R shown in FIG. 2 is information indicating a type of camera identified by the camera ID. That is, the camera classification is information for classifying whether the camera is the cart camera CA1, the store entrance camera CA2, the base camera CA3, or the accounting camera CA4.

The camera data of the camera record 91R shown in FIG. 2 is in-store coordinates or cart numbers. In the case of the camera record 91R for the cart camera CA1, the cart number is described (stored) as the camera data in the camera record 91R. That is, in the case of the camera record 91R for the cart camera CA1, the camera data is the cart number. The cart number is cart identification information of the cart SC provided with the cart camera CA1. The cart SC has the information terminal 10 as described above. Therefore, the cart number is also terminal identification information for identifying the information terminal 10 provided in the cart SC identified by the cart number. In the case of the camera record 91R for the store entrance camera CA2, the base camera CA3, and the accounting camera CA4, the in-store coordinates are described as the camera data in the camera record 91R. That is, in the case of the camera record 91R for the store entrance camera CA2, the base camera CA3, and the accounting camera CA4, the camera data is the in-store coordinates. The in-store coordinates are information for identifying a position in the store photographed by the camera. The in-store coordinates are obtained by regarding the floor surface of the store as an X-Y plane, setting an arbitrary position as an original point (X,Y)=(0, 0), and representing a difference from the original point by the X coordinate and the Y coordinate.

Description returns to the description of FIG. 1. The purchaser server 70 is a computer device specialized for managing information of the purchaser. The purchaser server 70 has a purchaser database (person database) 92. The purchaser database 92 is a collection of purchaser records (person records) 92R. The purchaser record 92R is a record of information for identifying a purchaser included in images obtained by photographing by the cart camera CA1, the store entrance camera CA2, the base camera CA3, and the accounting camera CA4. That is, in the purchaser record 92R, information regarding the purchaser for identifying the purchaser is described (stored). The purchaser database 92 is stored in a storage device 77. The storage device 77 may be built in the purchaser server 70. That is, the purchaser database 92 may be stored in the storage device 77 built in the purchaser server 70. Further, the storage device 77 may be externally attached to the purchaser server 70. That is, the purchaser database 92 may be stored in the storage device 77 externally attached to the purchaser server 70. Further, the storage device 77 may be provided in another server that can communicate with the purchaser server 70. That is, the purchaser database 92 may be stored in a storage device 77 of another server that can communicate with the purchaser server 70. In the following description, a collection of purchaser records 92R in which the information regarding the purchaser has been described and the storage device 77 storing the collection are collectively referred to as the purchaser database 92.

Figure 3:
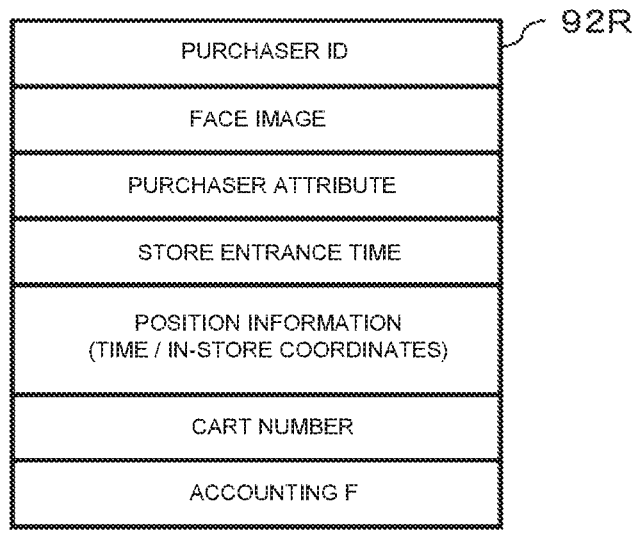
FIG. 3 is a schematic diagram showing a data configuration of a purchaser record according to the embodiment.

FIG. 3 is a schematic diagram showing a data configuration of the purchaser record 92R. As shown in FIG. 3, the purchaser record 92R includes a purchaser ID, a face image, a purchaser attribute, a store entrance time, position information, a cart number, and an accounting flag (accounting F) as the information regarding the purchaser for identifying the purchaser. The purchaser ID is unique identification data assigned to each purchaser to individually identify the purchaser. The face image is image data obtained by photographing a face of the purchaser. The face image is basically extracted from the image data obtained by photographing by the store entrance camera CA2 and is described in the purchaser record 92R. The face image may be extracted from the image data obtained by photographing by the cart camera CA1 or the base camera CA3 and may be described in the purchaser record 92R.

The purchaser attribute of the purchaser record 92R shown in FIG. 3 is information indicating an attribute such as gender and age of the purchaser. The store entrance time of the purchaser record 92R is a time when the purchaser enters the store. The position information of the purchaser record 92R is the in-store coordinates for identifying a position in the store where the purchaser is located and the time at that point. The cart number of the purchaser record 92R is cart identification information of the cart SC used by the purchaser. The cart number is also terminal identification information for identifying the information terminal 10. The accounting flag F of the purchaser record 92R is 1-bit data for identifying whether or not the purchaser has performed accounting. In the embodiment, the accounting flag F before performing accounting is set to "0", and the accounting flag F after performing accounting is set to "1".

Description returns to the description of FIG. 1. The provision server 80 is a computer device specialized for managing information to be provided to the purchaser who has come to the base. The provision server 80 has a provision information database 93. The provision information database 93 is a collection of provision information records 93R in which the information to be provided to the purchaser has been described. The provision information database 93 is stored in a storage device 87. The storage device 87 may be built in the provision server 80. That is, the provision information database 93 may be stored in the storage device 87 built in the provision server 80. Further, the storage device 87 may be externally attached to the provision server 80. That is, the provision server 80 may be stored in the storage device 87 externally attached to the provision server 80. Further, the storage device 87 may be provided in another server that can communicate with the provision server 80. That is, the provision information database 93 may be stored in a storage device 87 of another server that can communicate with the provision server 80. In the following description, the collection of provision information records 93R and the storage device 87 storing the collection are collectively referred to as the provision information database 93.

Figure 4:
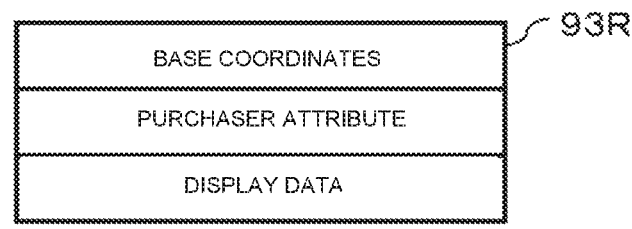
FIG. 4 is a schematic diagram showing a data configuration of a provision information record according to the embodiment.

FIG. 4 is a schematic diagram showing a data configuration of the provision information record 93R. As shown in FIG. 4, the provision information record 93R includes base coordinates, a purchaser attribute, and display data. The base coordinates of the provision information record 93R are information for identifying a base where a purchaser (purchaser to be an information provision target) to whom information managed on the basis of the provision information record 93R is provided is located. The base where the purchaser is located is identified as a position in the store. The base coordinates of the provision information record 93R are matched with the in-store coordinates (refer to FIG. 3) set to the camera record 91R including the camera ID of the base camera CA3. The purchaser attribute of the provision information record 93R is an attribute of the purchaser to whom the information (information based on the display data) managed on the basis of the provision information record 93R is provided.

The display data of the provision information record 93R shown in FIG. 4 is an example of information to be provided to a purchaser having an attribute matched with the above purchaser attribute among purchasers who have come to the base identified by the base coordinates of the provision information record 93R. In the embodiment, information (information based on the display data) is displayed on a display device of the information terminal 10 of the cart SC used by the purchaser, so that the information managed on the basis of the provision information record 93R is provided to the purchaser. The display data is, for example, text data. The display data may be image data of a still image or a moving image. Incidentally, when the information terminal 10 is provided with a speaker, the display data and audio data may be described in the provision information record 93R. Alternatively, when the information terminal 10 is provided with the speaker, instead of the display data, only the audio data may be described in the provision information record 93R.

Figure 5:
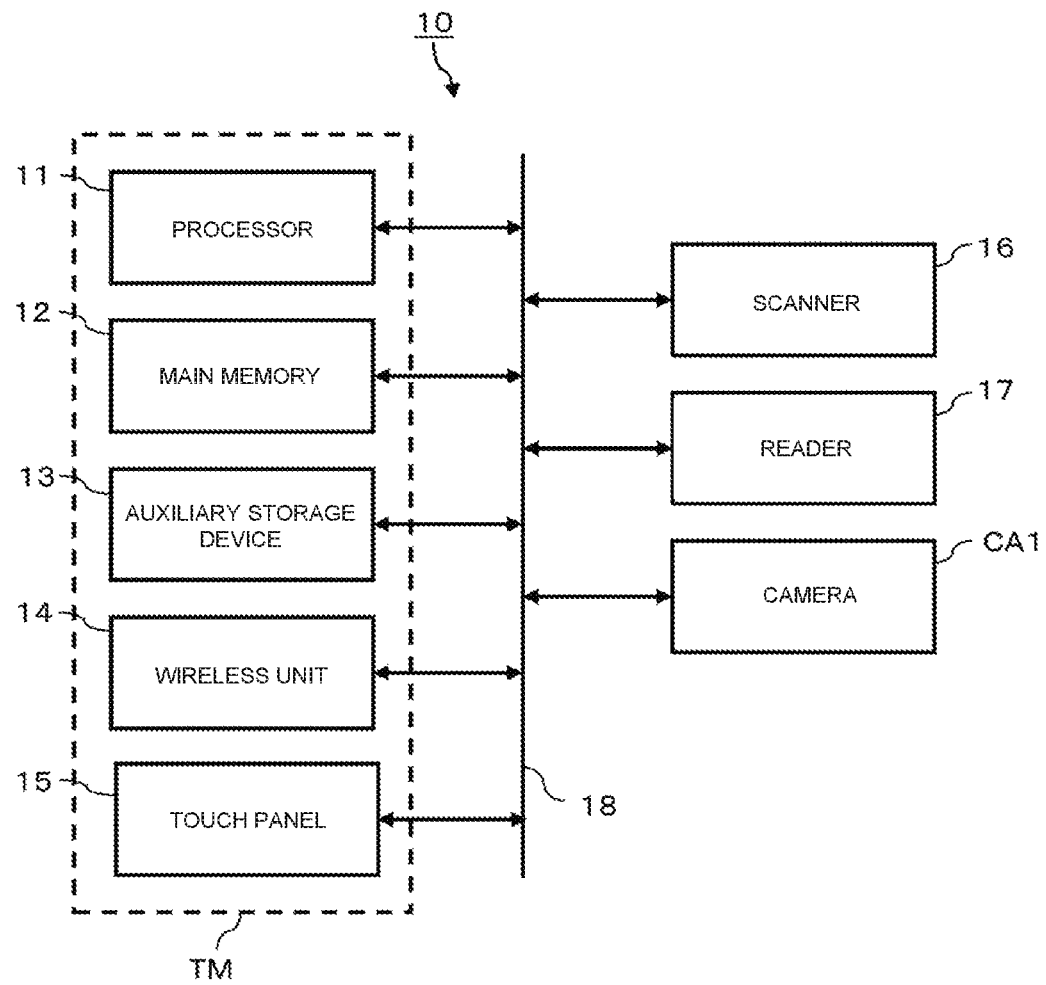
FIG. 5 is a block diagram showing a main part circuit of an information terminal according to the embodiment.

FIG. 5 is a block diagram showing a main part circuit of the information terminal 10. The information terminal 10 has a processor 11, a main memory 12, an auxiliary storage device 13, a wireless unit 14, a touch panel 15, a scanner 16, a reader 17, a camera CA1, and a system transmission line 18. The system transmission line 18 includes an address bus, a data bus, a control signal line, and the like. As shown in FIG. 5, the processor 11, the main memory 12, the auxiliary storage device 13, the wireless unit 14, the touch panel 15, the scanner 16, the reader 17, and the camera CA1 of the information terminal 10 are connected to the system transmission line 18. A computer is configured by the processor 11, the main memory 12, and the auxiliary storage device 13 of the information terminal 10 and the system transmission line 18 connecting them.

The processor 11 corresponds to a center portion of the computer. The processor 11 controls each unit to execute various functions as the information terminal 10, according to an operating system or an application program. The processor 11 is, for example, a central processing unit (CPU).

The main memory 12 corresponds to a main storage portion of the computer. The main memory 12 includes a non-volatile memory area and a volatile memory area. The main memory 12 stores the operating system or the application program in the non-volatile memory area. The main memory 12 may store data necessary for the processor 11 to execute processing for controlling each unit in the non-volatile or volatile memory area. The main memory 12 may use the volatile memory area as a work area in which data is appropriately rewritten by the processor 11. The non-volatile memory area is, for example, a read only memory (ROM). The volatile memory area is, for example, a random access memory (RAM).

The auxiliary storage device 13 corresponds to an auxiliary storage portion of the computer. The auxiliary storage device 13 is, for example, an electric erasable programmable read-only memory (EEPROM), a hard disc drive (HDD), or a solid state drive (SSD). The auxiliary storage device 13 stores data used when the processor 11 performs various processing or data generated by the processing of the processor 11. The auxiliary storage device 13 may also store the application program. The auxiliary storage device 13 stores the cart identification information of the cart SC having the information terminal 10, that is, the cart number. The cart number is also the terminal identification information for identifying the information terminal 10 as described above.

The wireless unit 14 performs wireless communication of data with the access point 20, according to a wireless communication protocol.

The touch panel 15 is a device having both an input device and a display device of the information terminal 10. The touch panel 15 detects a touch position for a displayed image and outputs touch position information to the processor 11.

The scanner 16 reads a code symbol such as a barcode attached to a product and a two-dimensional data code. A code symbol representing a product code is attached to the product. The scanner 16 outputs data of the read code symbol to the processor 11. The scanner 16 may be of a type that reads the code symbol by scanning a laser beam. The scanner 16 may be an imaging device, or may be of a type that reads the code symbol from an imaged image.

The reader 17 reads data recorded on a recording medium and outputs the read data to the processor 11. When the recording medium is a magnetic card, the reader 17 is a magnetic card reader. When the recording medium is a contact-type IC card, the reader 17 is an IC card reader. In the case of a recording medium using radio frequency identification (RFID) like a non-contact-type IC card or a smart phone, the reader 17 is an RFID reader.

In the information terminal 10 having the main part circuit described above, the processor 11, the main memory 12, the auxiliary storage device 13, the wireless unit 14, and the touch panel 15 are included in a tablet terminal TM. That is, the information terminal 10 includes the tablet terminal TM and the scanner 16, the reader 17, and the camera CA1 electrically connected to the tablet terminal TM.

Figure 6:
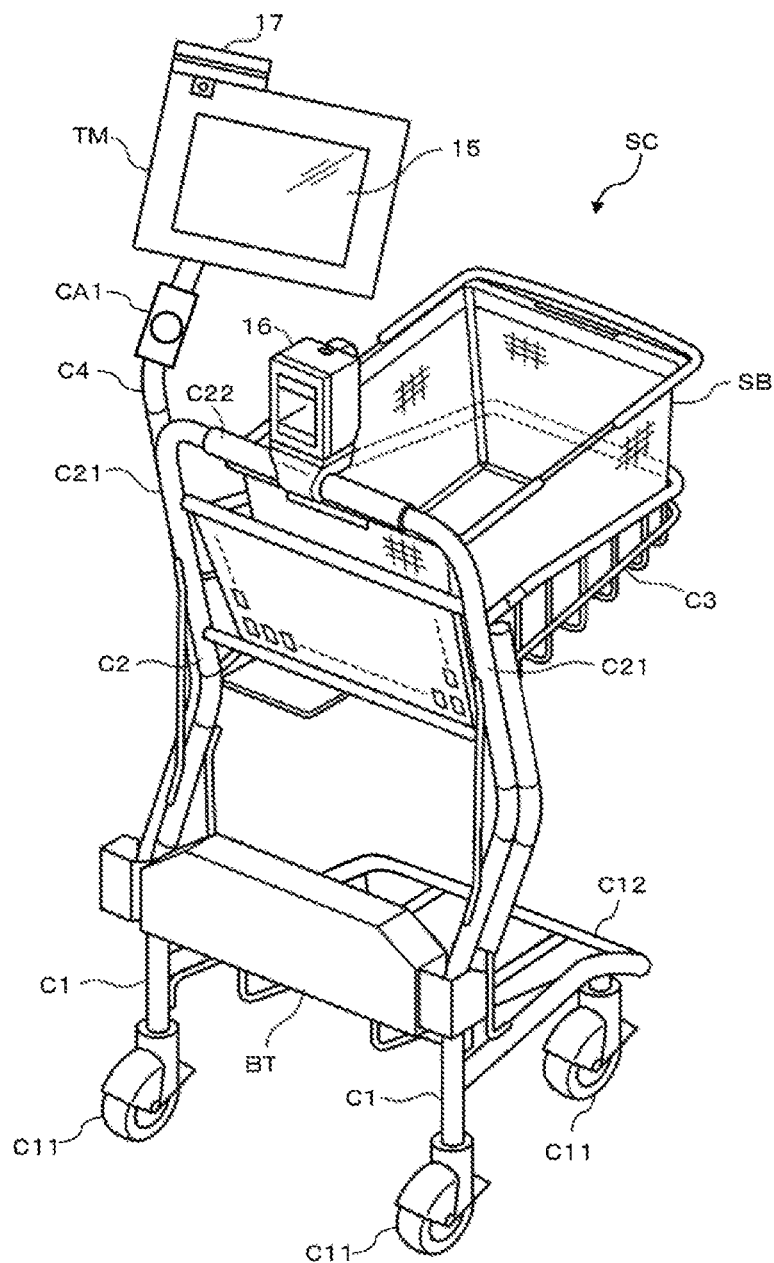
FIG. 6 is a perspective view showing an example of a cart having the information terminal according to the embodiment.

FIG. 6 is a perspective view showing an example of the cart SC having the information terminal 10. The cart SC has a caster portion C1 for movement, a handle frame portion C2, and a basket receiving portion C3. The caster portion C1 has four wheels C11 for smoothly moving the cart SC on the floor surface. Further, the caster portion C1 has a receiving portion C12 for placing a large package not entering a basket SB, for example. The handle frame portion C2 includes a pair of vertical frames C21 and C21 and a handle bar C22. The pair of vertical frames C21 and C21 are erected on the rear wheel side of the caster portion C1. The handle bar C22 connects upper ends of the pair of vertical frames C21 and C21. The basket receiving portion C3 is provided so as to protrude forward from a middle portion of the handle frame portion C2. The cart SC can place the basket SB provided in the store on the basket receiving portion C3. The basket SB is used for storing the products.

The scanner 16 is attached to a middle portion of the handle bar C22. As shown in FIG. 6, the scanner 16 is attached to the handle bar C22 so that a read window is located on the front side. The front side is the side on which a purchaser who holds the handle bar C22 and presses the cart SC stands.

A pole C4 is attached to one vertical frame C21. A tip of the pole C4 is located above the handle bar C22. The tablet terminal TM is attached to the tip of the pole C4 with a screen of the touch panel 15 toward the front side. The reader 17 is attached to the tablet terminal TM so that a card slit is located on the front side. The reader 17 shown in FIG. 5 is a magnetic card reader. The camera CA1 is attached to a middle portion of the pole C4 so as to photograph a photographing region including a face of a customer who grips the handle bar C22.

A battery BT is attached across the vertical frames C21 and C21 on the lower end side of the handle frame portion C2. The battery BT is a drive power supply of the tablet terminal TM, the scanner 16, the reader 17, and the camera CA1.

Figure 7:
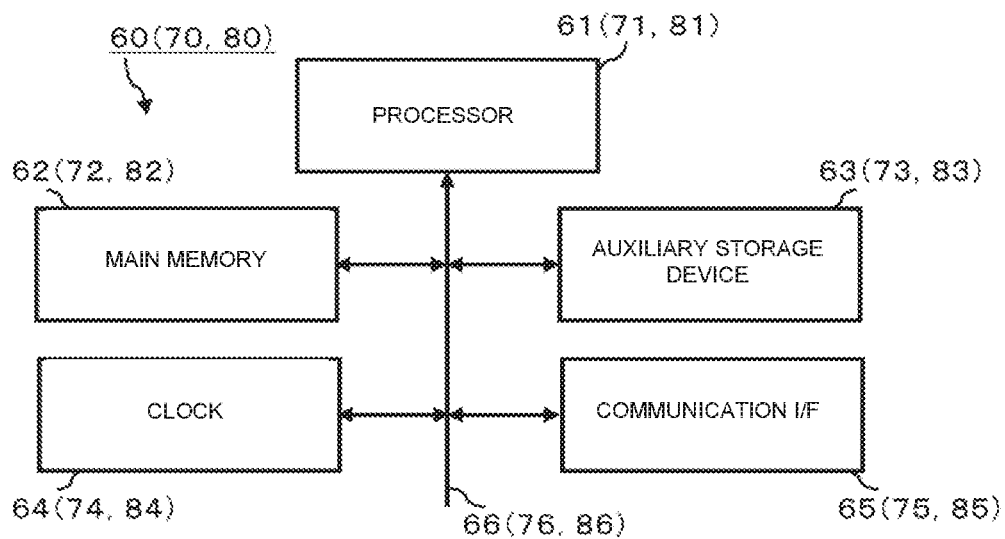
FIG. 7 is a block diagram showing a main part circuit of an image processing server according to the embodiment.

FIG. 7 is a block diagram showing a main part circuit of the image processing server 60. The image processing server 60 has a processor 61, a main memory 62, an auxiliary storage device 63, a clock 64, a communication interface 65, and a system transmission line 66. The system transmission line 66 includes an address bus, a data bus, a control signal line, and the like. As shown in FIG. 7, the processor 61, the main memory 62, the auxiliary storage device 63, the clock 64, and the communication interface 65 of the image processing server 60 are connected to the system transmission line 66 directly or via a signal input/output circuit not shown in the drawings. The image processing server 60 configures a computer by the processor 61, the main memory 62, and the auxiliary storage device 63 and the system transmission line 66 connecting them.

The processor 61 corresponds to a center portion of the computer. The processor 61 controls each unit to execute various functions as the image processing server 60, according to an operating system or an application program. The processor 61 is, for example, a CPU.

The main memory 62 corresponds to a main storage portion of the computer. The main memory 62 includes a non-volatile memory area and a volatile memory area. The main memory 62 stores the operating system and the application program in the non-volatile memory area. Further, the main memory 62 may store data necessary for the processor 61 to execute processing for controlling each unit in the non-volatile or volatile memory area. The main memory 62 uses the volatile memory area as a work area in which data is appropriately rewritten by the processor 61. In the main memory 62, the non-volatile memory area is, for example, a ROM, and the volatile memory area is, for example, a RAM.

The auxiliary storage device 63 corresponds to an auxiliary storage portion of the computer. The auxiliary storage device 63 is, for example, an EEPROM, an HDD, or an SSD. The auxiliary storage device 63 stores data used when the processor 61 performs various processing or data generated by the processing of the processor 61. The auxiliary storage device 63 may also store the application program.

The clock 64 functions as a time information source of the image processing server 60. The processor 61 clocks the current date and time, on the basis of time information clocked by the clock 64.

The communication interface 65 performs transmission and reception of data with each unit connected via the network 2, according to a communication protocol. For example, the communication interface 65 communicates with the camera CA1, the store entrance camera CA2, the base camera CA3, and the accounting camera CA4 via the camera interface 40. Further, the communication interface 65 communicates with at least the purchaser server 70 (communication interface 75) and the provision server 80 (communication interface 85) described later.

A main part circuit of each of the purchaser server 70 and the provision server 80 is the same as that of the image processing server 60 described above. That is, as shown in FIG. 7, the purchaser server 70 has a processor 71, a main memory 72, an auxiliary storage device 73, a clock 74, a communication interface 75, and a system transmission line 76. Further, as shown in FIG. 7, the provision server 80 has a processor 81, a main memory 82, an auxiliary storage device 83, a clock 84, a communication interface 85, and a system transmission line 86. The communication interface 75 of the purchaser server 70 communicates with at least the image processing server 60 (communication interface 65) and the provision server 80 (communication interface 85). Further, the communication interface 75 of the provision server 80 communicates with at least the purchaser server 70 (the communication interface 75) and the information terminal 10.

Figure 8:
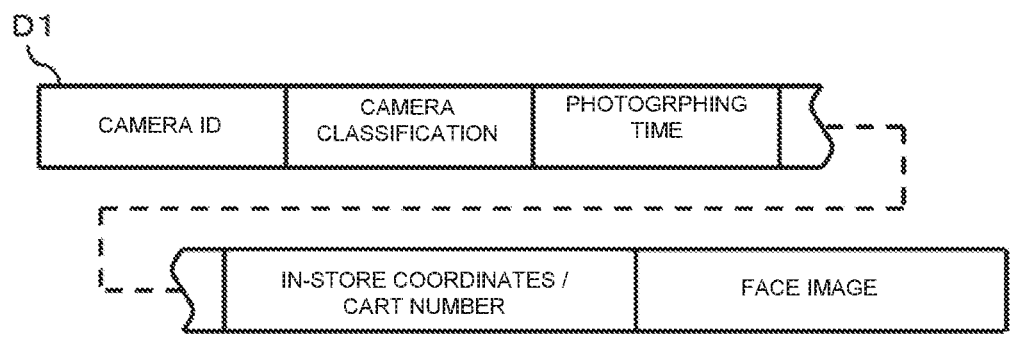
FIG. 8 is a schematic diagram showing a format of photographing data according to the embodiment.
Figure 9:
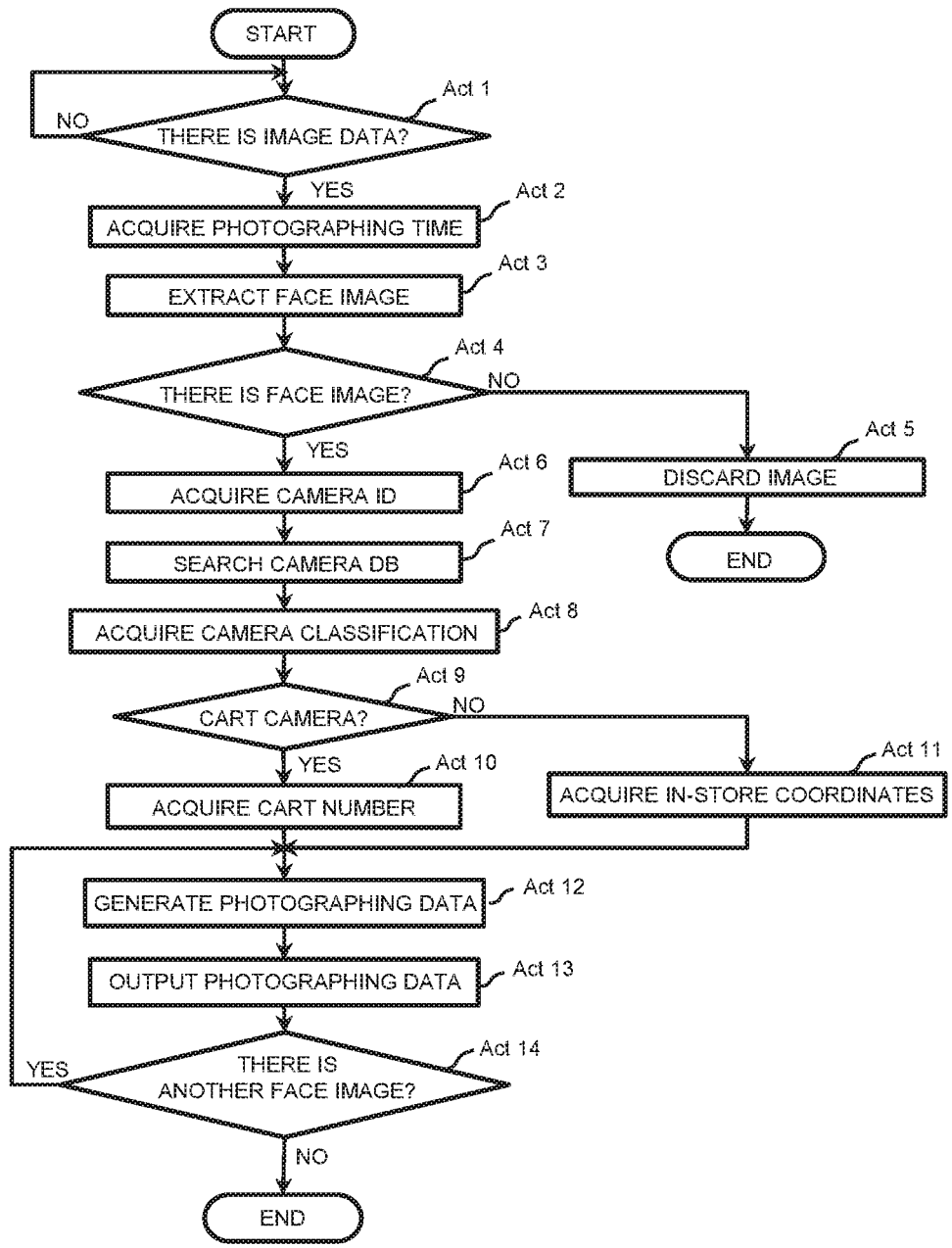
FIG. 9 is a flowchart showing information processing executed by a processor of the image processing server according to the embodiment, according to a control program.

FIG. 8 is a schematic diagram showing a format of photographing data D1 output from the image processing server 60 to the purchaser server 70. FIG. 9 is a flowchart showing information processing executed by the processor 61 of the image processing server 60, according to a control program. FIGS. 10 to 14 are flowcharts showing information processing executed by the processor 71 of the purchaser server 70, according to a control program. FIG. 15 is a flowchart showing information processing executed by the processor 81 of the provision server 80, according to a control program. Hereinafter, a main operation of the store system 1 will be described using FIGS. 8 to 16. The operation described below is an example. If a similar result is obtained, a processing procedure can be appropriately changed and implemented.

First, the store entrance camera CA2, the base camera CA3, and the accounting camera CA4 repeat a photographing operation at a constant cycle during a period of time from a store opening time to a store closing time. Each of the store entrance camera CA2, the base camera CA3, and the accounting camera CA4 outputs image data obtained by the photographing operation to the camera interface 40 together with a camera ID of the own device. The camera ID and the image data output to the camera interface 40 are sent to the image processing server 60 via the network 2. The cart camera CA1 is activated when a user logs into the information terminal 10, and repeats the photographing operation at the constant cycle. The photographing operation is continuously performed until the user logs out from the information terminal 10. The image data obtained by photographing by the cart camera CA1 is wirelessly transmitted via the wireless unit 14 together with the camera ID of the own device under the control of the processor 11, and is received by the access point 20. The camera ID and the image data received by the access point 20 are sent to the image processing server 60 via the network 2. Hereinafter, the camera ID and the image data may be simply referred to as image data.

Here, the information processing of the image processing server 60 will be described using FIG. 9. In Act1 of FIG. 9, the processor 61 of the image processing server 60 waits for the image data. When the image data is sent via the network 2, in Act1, the processor 61 determines that the image data has been received by the communication interface 65 (YES in Act1), and the processing of the processor 61 proceeds to processing of Act2. In Act2, the processor 61 acquires the date and time clocked by the clock 64 as a photographing time from the clock 64. Next, in Act3, the processor 61 analyzes the image data and extracts a face image of a person.

In Act4, the processor 61 confirms whether or not a predetermined face image has been extracted. The predetermined face image is a face image capable of recognizing the face of the person at a certain recognition rate or more. When the processor 61 confirms that no face image has been extracted (NO in Act4), the processing of the processor 61 proceeds to processing of Act5. In Act5, the processor 61 discards the image data. If the image data is discarded, the processor 61 ends the processing on the image data received in Act1 described above.

On the other hand, when the processor 61 confirms that the face image has been extracted in Act4 (YES in Act4), the processing of the processor 61 proceeds to processing of Act6. In Act6, the processor 61 acquires the camera ID received together with the image data by the communication interface 65. In Act7, the processor 61 searches the camera database 91. That is, the processor 61 searches the camera database 91 for the acquired camera ID to be search target data (data of a search key). Then, in Act8, the processor 61 reads, from the camera database 91, the camera record 91R (refer to FIG. 2) including the camera ID to be the search target data. The processor 61 acquires a camera classification from the read camera record 91R.

In Act9, the processor 61 confirms whether or not the acquired camera classification indicates the cart camera CA1. When the processor 61 confirms that the acquired camera classification indicates the cart camera CA1 (YES in Act9), the processing of the processor 61 proceeds to processing of Act10. In Act10, the processor 61 acquires a cart number to be camera data of the camera record 91R.

When the processor 61 confirms that the camera classification does not indicate the cart camera CA1 (NO in Act9), the processing of the processor 61 proceeds to processing of Act11. That is, when the processor 61 confirms that the camera classification indicates the store entrance camera CA2, the base camera CA3, or the accounting camera CA4, the processing of the processor 61 proceeds to the processing of Act11. In Act11, the processor 61 acquires the in-store coordinates to be the camera data of the camera record 91R.

If the processor 61 ends the processing of Act10 or Act11, in Act12, the processor 61 generates the photographing data D1 of the format shown in FIG. 8. That is, the processor 61 generates the photographing data D1 including the camera ID acquired in Act6, the camera classification acquired in Act8, the photographing time acquired in Act2, the cart number or the in-store coordinates to be the camera data acquired in Act10 or Act11, and the face image extracted in Act3. In Act13, the processor 61 controls the communication interface 65 so as to output the photographing data D1 to the purchaser server 70. The generated photographing data D1 is transmitted from the communication interface 65 to the purchaser server 70 via the network 2 by the above control.

After transmitting the photographing data D1 to the purchaser server 70, in Act14, the processor 61 confirms whether or not another face image is extracted from the image data (image data received in Act1), that is, a face image different from the face image (refer to Act3) extracted immediately before is extracted. When the processor 61 confirms that another face image is extracted (YES in Act14), the processing of the processor 61 returns to the processing of Act12. That is, when the processor 61 extracts a plurality of face images from the image data, the processor 61 generates photographing data D1 different from the photographing data D1 generated immediately before in only the face image, and controls the communication interface 65 so as to output the photographing data D1 to the purchaser server 70. As described above, when the plurality of face images is extracted from the image data, the processor 61 generates the photographing data D1 by the number of the face images, and controls the communication interface 65 so as to output the photographing data D1 to the purchaser server 70. Further, in Act14, when the processor 61 confirms that another face image is not extracted (NO in Act14), the processing of the processor 61 ends.

That is, if the photographing data D1 corresponding to the number of face images extracted from the image data is output, the processor 61 ends the processing on the image data.

Figure 10:
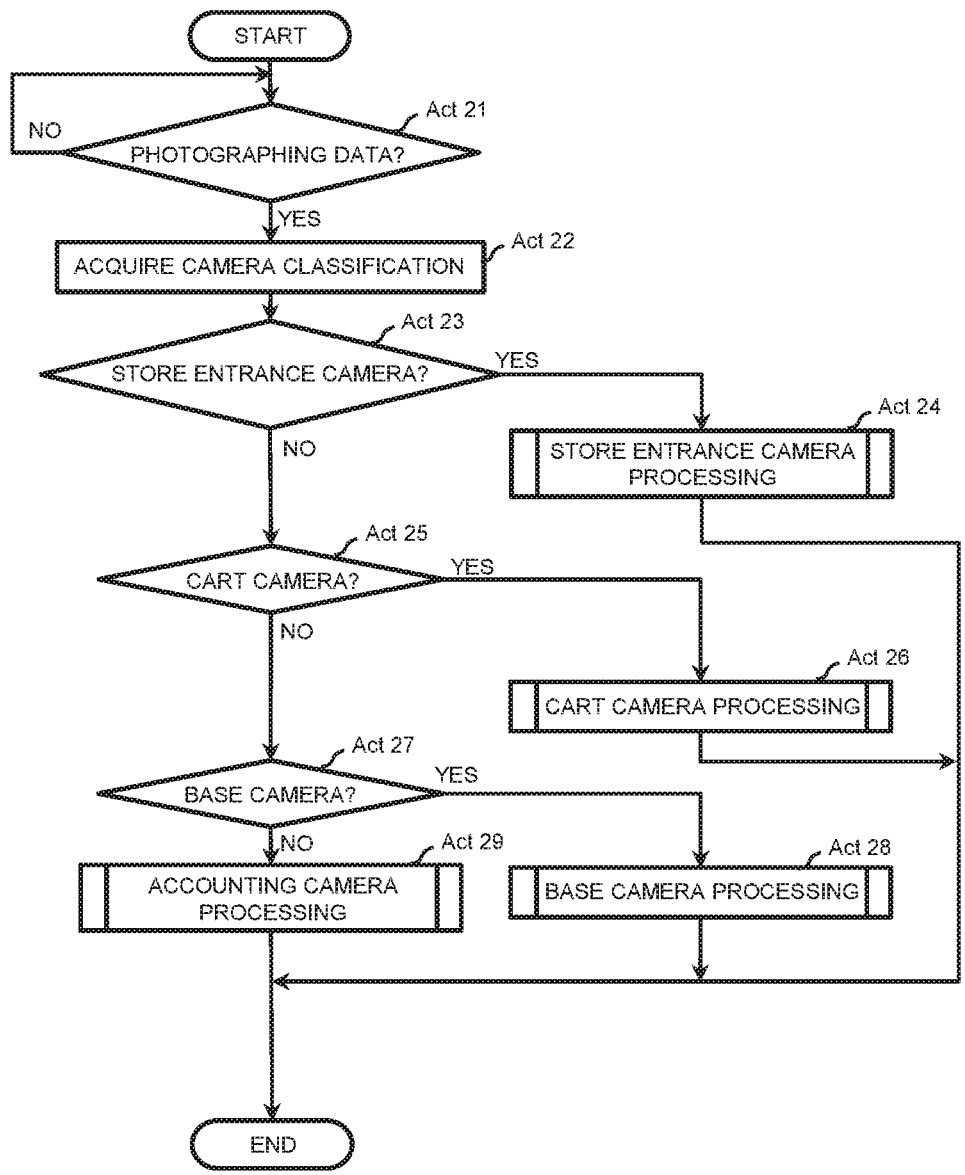
FIG. 10 is a flowchart showing information processing executed by a processor of a purchaser server according to the embodiment, according to a control program.

Next, an operation of the purchaser server 70 will be described using FIGS. 10 to 14. FIG. 10 is a flowchart showing information processing executed by the purchaser server 70. In Act21 of FIG. 10, the processor 71 of the purchaser server 70 waits for the photographing data D1. If the photographing data D1 is sent from the image processing server 60 via the network 2, the processor 71 determines that the photographing data D1 has been received by the communication interface 75 (YES in Act21), and the processing of the processor 71 proceeds to processing of Act22. In Act22, the processor 71 acquires the camera classification from the photographing data D1 (refer to FIG. 8). Then, in Act23, the processor 71 confirms whether or not the camera classification of the photographing data D1 indicates the store entrance camera CA2. When the processor 71 confirms that the camera classification indicates the store entrance camera CA2 (YES in Act23), the processing of the processor 71 proceeds to processing of Act24. In Act24, the processor 71 executes store entrance camera processing. The store entrance camera processing includes processing for generating the purchaser record 92R (refer to FIG. 3) of a purchaser who has newly entered the store and storing the generated purchaser record 92R in the purchaser database 92.

Figure 11:
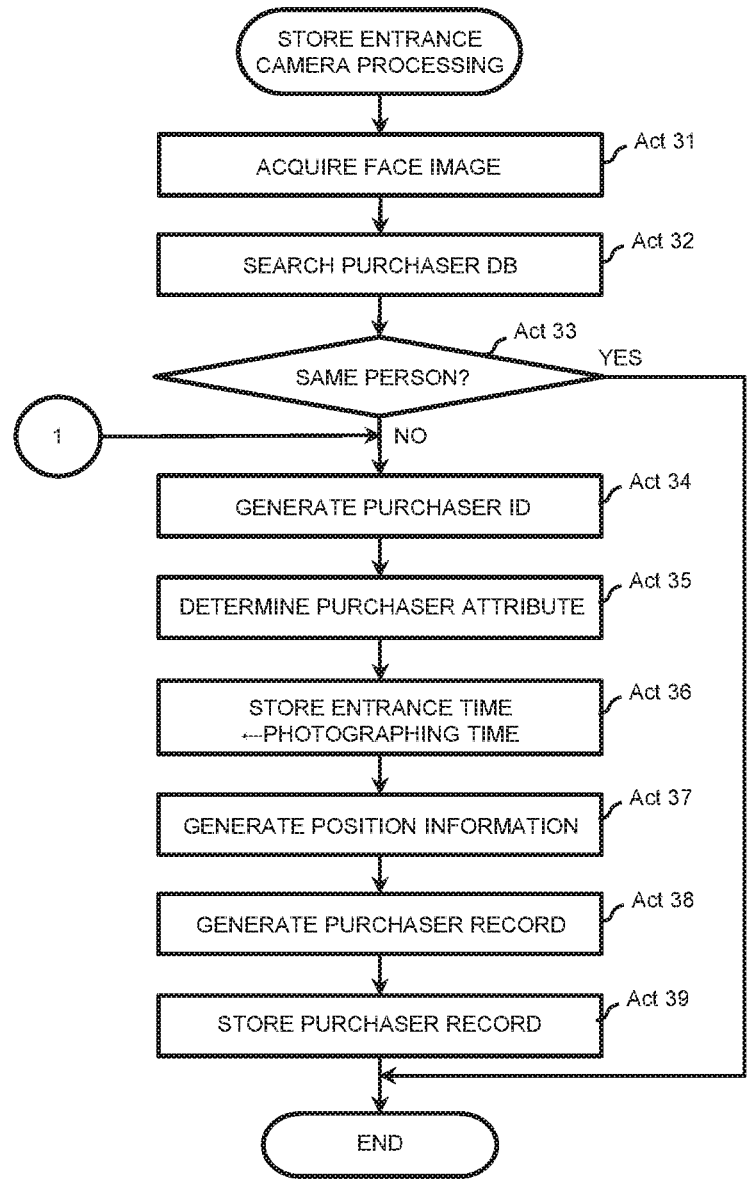
FIG. 11 is a flowchart showing a specific example of store entrance camera processing shown in FIG. 10.

FIG. 11 is a flowchart specifically showing the store entrance camera processing. As described above, the store entrance camera CA2 photographs a face image of the purchaser who enters the store. Therefore, the face image included in the photographing data D1 (refer to FIG. 8) generated from the image obtained by photographing by the store entrance camera CA2 is the face image of the purchaser who has entered the store.

When the processor 71 starts the store entrance camera processing, the processor 71 acquires the face image from the photographing data D1 (refer to FIG. 8) in Act31 of FIG. 11. Then, in Act32, the processor 71 searches the purchaser database 92. That is, the processor 71 searches the purchaser database 92 for the face image to be search target data. Specifically, for example, the processor 71 sequentially compares the face image to be the search target data and the face image of the purchaser record 92R (refer to FIG. 3) in which an accounting flag is not set to "1". Then, in Act33, the processor 71 finds the purchaser record 92R including a face image having a similarity that can be identified as the same person as the person of the face image to be the search target data. When the processor 71 finds the corresponding purchaser record 92R (YES in Act33), the processor 71 ends the store entrance camera processing. That is, when the processor 71 confirms that the purchaser record 92R including the face image having the similarity that can be identified as the same person as the person of the face image acquired in Act31 is already stored in the purchaser database 92, the processor 71 ends the store entrance camera processing.

When the processor 71 does not find the corresponding purchaser record 92R (NO in Act33), the processing of the processor 71 proceeds to processing of Act34. In other words, when the processor 71 confirms that the purchaser record 92R including the face image having the similarity that can be identified as the same person as the person of the face image acquired in Act31 is not stored in the purchaser database 92, the processing of the processor 71 proceeds to the processing of Act34. In Act34, the processor 71 generates a new purchaser ID. Next, in Act35, the processor 71 determines an attribute such as the gender and the age of the purchaser from the face image (refer to Act31) included in the photographing data D1 (refer to FIG. 8). Next, in Act36, the processor 71 acquires the photographing time of the photographing data D1 as the store entrance time. Next, in Act37, the processor 71 generates position information from the photographing time and the in-store coordinates of the photographing data D1.

Then, in Act38, the processor 71 generates the purchaser record 92R (refer to FIG. 3) from the purchaser ID, the purchaser attribute, the store entrance time, and the position information obtained by the processing of Act34 to Act37 and the face image included in the photographing data D1. The cart number is not described in the purchaser record 92R. Further, the accounting flag is reset to "0". In Act39, the processor 71 stores the purchaser record 92R in the purchaser database 92. If the processor 71 stores the purchaser record 92R in the purchaser database 92, the processor 71 ends the store entrance camera processing.

As described above, if the purchaser enters the store from the entrance of the store, the face image of the purchaser is photographed by the store entrance camera CA2. If the face image of the purchaser is photographed by the store entrance camera CA2, the purchaser record 92R to which the purchaser ID unique to the purchaser has been set is generated, and the purchaser record 92R is stored in the purchaser database 92. However, when the purchaser for whom the purchaser record 92R is created leaves the store and enters the store again, in the processing of Act33 of FIG. 11, the processor 71 finds the purchaser record 92R storing a face image having a similarity that can be identified as the same person as the person who has entered the store again. Then, when the processor 71 finds the corresponding purchaser record 92R (YES in Act33), the processor 71 ends the store entrance camera processing. Therefore, the purchaser records of the same purchaser are not redundantly generated.

Description returns to the description of FIG. 10. When the processor 71 ends the store entrance camera processing (Act24 in FIG. 10), the processor 71 ends the processing on the photographing data D1 received in Act21.

Meanwhile, when the processor 71 confirms that the camera classification acquired from the photographing data D1 (refer to FIG. 8) does not indicate the store entrance camera CA2 (NO in Act23), the processing of the processor 71 proceeds to processing of Act25. In Act25, the processor 71 confirms whether or not the camera classification of the photographing data D1 indicates the cart camera CA1. When the processor 71 confirms that the camera classification indicates the cart camera CA1 (YES in Act25), the processing of the processor 71 proceeds to processing of Act26. In Act26, the processor 71 executes cart camera processing. The cart camera processing includes processing for setting a cart number to the purchaser record 92R of the purchaser who performs shopping by operating the cart SC and updating the purchaser record 92R.

Figure 12:
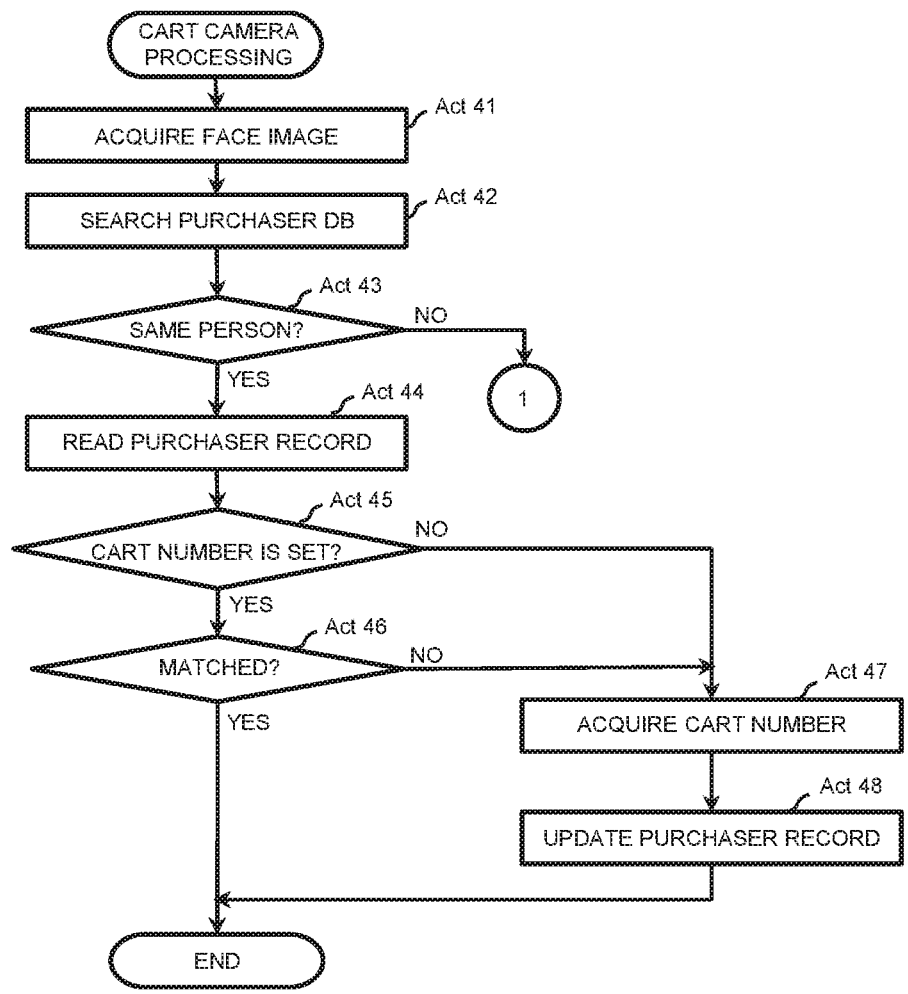
FIG. 12 is a flowchart showing a specific example of cart camera processing shown in FIG. 10.

FIG. 12 is a flowchart specifically showing the cart camera processing. As described above, the cart camera CA1 photographs a face image of the purchaser who operates the cart SC. Therefore, the face image included in the photographing data D1 generated from the image obtained by photographing by the cart camera CA1 is the face image of the purchaser who performs shopping by operating the cart SC.

When the processor 71 starts the cart camera processing, the processor 71 acquires the face image from the photographing data D1 (refer to FIG. 8) in Act41. Then, in Act42, the processor 71 searches the purchaser database 92. That is, the processor 71 searches the purchaser database 92 for the face image to be the search target data. Specifically, for example, the processor 71 sequentially compares the face image to be the search target data and the face image of the purchaser record 92R in which an accounting flag is not set to "1". Then, in Act43, the processor 71 finds the purchaser record 92R including a face image having a similarity that can be identified as the same person as the person of the face image to be the search target data. When the processor 71 finds the corresponding purchaser record 92R (YES in Act43), the processing of the processor 71 proceeds to processing of Act44. In other words, when the processor 71 confirms that the purchaser record 92R including the face image having the similarity that can be identified as the same person as the person of the face image acquired in Act41 is stored in the purchaser database 92, the processing of the processor 71 proceeds to the processing of Act44. In Act44, the processor reads the corresponding purchaser record 92R as the purchaser record 92R to be an update target, from the purchaser database 92.

In Act45, the processor 71 confirms whether or not the cart number is set to the read purchaser record 92R. When the processor 71 confirms that the cart number is set (YES in Act45), the processing of the processor 71 proceeds to processing of Act46. In Act46, the processor 71 confirms whether or not the cart number set to the purchaser record 92R is matched with the cart number included in the photographing data D1 (refer to FIG. 8). When the processor 71 confirms that both the cart numbers are matched (YES in Act46), the processor 71 ends the cart camera processing.

When the processor 71 confirms that the cart number is not set to the purchaser record 92R to be the update target (NO in Act45), the processing of the processor 71 proceeds to Act47. Further, when the processor 71 confirms that the cart number set to the purchaser record 92R is not matched with the cart number included in the photographing data D1 (NO in Act46), the processing of the processor 71 proceeds to processing of Act47.

In Act47, the processor 71 acquires the cart number included in the photographing data D1. Then, in Act48, the processor 71 describes (sets) the cart number acquired in Act47 in the purchaser record 92R to be the update target. After describing the cart number, the processor 71 overwrites and stores the purchaser record 92R in the purchaser database 92. In this way, the processor 71 ends the cart camera processing.

As described above, if the purchaser operates the cart SC, a face image of the purchaser is photographed by the cart camera CA1. If the face image of the purchaser is photographed by the cart camera CA1, the cart number of the cart SC operated by the purchaser is described in the purchaser record 92R including the face image of the purchaser. That is, if the face image of the purchaser is photographed by the cart camera CA1, the cart number of the cart SC operated by the purchaser is described in the purchaser record 92R to which the purchaser ID unique to the purchaser has been set.

When the cart number of the cart SC operated by the purchaser is already described in the purchaser record 92R, the processor confirms that the cart number set to the purchaser record 92R and the cart number included in the photographing data D1 are matched (YES in Act46 of FIG. 12). When the processor confirms that both the cart numbers are matched, the processor ends the cart camera processing.

Therefore, when the cart number of the cart SC operated by the purchaser is already described in the purchaser record 92R, the processing of Act47 and Act48 is not executed. However, when the purchaser starts operating another cart SC, the processor confirms that the cart number set to the purchaser record 92R and the cart number included in the photographing data D1 are not matched (NO in Act46 of FIG. 12). Therefore, the processing of Act47 and Act48 is executed. For this reason, a cart number of the latest cart SC operated by the purchaser identified by the purchaser ID of the purchaser record 92R is described in the purchaser record 92R.

Incidentally, in Act43, when the processor 71 does not find the purchaser record 92R storing the face image having the similarity that can be identified as the same person as the person of the face image to be the search target data (NO in Act43 of FIG. 12), the processing of the processor 71 proceeds to the processing of Act34 of the store entrance camera processing shown in FIG. 11. That is, when the processor 71 confirms that the purchaser record 92R including the face image having the similarity that can be identified as the same person as the person of the face image acquired in Act41 is not stored in the purchaser database 92, the processing of the processor 71 proceeds to the processing of Act34 of the store entrance camera processing shown in FIG. 11. Then, the processor 71 executes the processing of Act34 to Act39 as described above. At this time, in Act37, the processor 71 generates position information only from the photographing time. Further, in Act38, the processor 71 describes the cart number in the purchaser record 92R.

Therefore, a purchaser who is not photographed by the store entrance camera CA2 operates the cart SC, so that a purchaser record 92R to which a purchaser ID unique to the purchaser has been set is generated. Then, the generated purchaser record 92R is stored in the purchaser database 92.

Description returns to the description of FIG. 10. When the processor 71 ends the cart camera processing (Act26 in FIG. 10), the processor 71 ends the processing on the photographing data D1 received in Act21.

When the processor 71 confirms that the camera classification acquired from the photographing data D1 (refer to FIG. 8) does not indicate the store entrance camera CA2 and the cart camera CA1 (NO in Act25), the processing of the processor 71 proceeds to processing of Act27. In Act27, the processor 71 confirms whether or not the camera classification of the photographing data D1 indicates the base camera CA3. When the processor 71 confirms that the camera classification indicates the base camera CA3 (YES in Act27), the processing of the processor 71 proceeds to processing of Act28. In Act28, the processor 71 executes base camera processing. The base camera processing includes processing for updating the purchaser record 92R by describing position information in the purchaser record 92R of the purchaser who has come to the sales floor base. Further, the base camera processing includes processing for transmitting a provision command based on the updated purchaser record 92R to the provision server 80.

Figure 13:
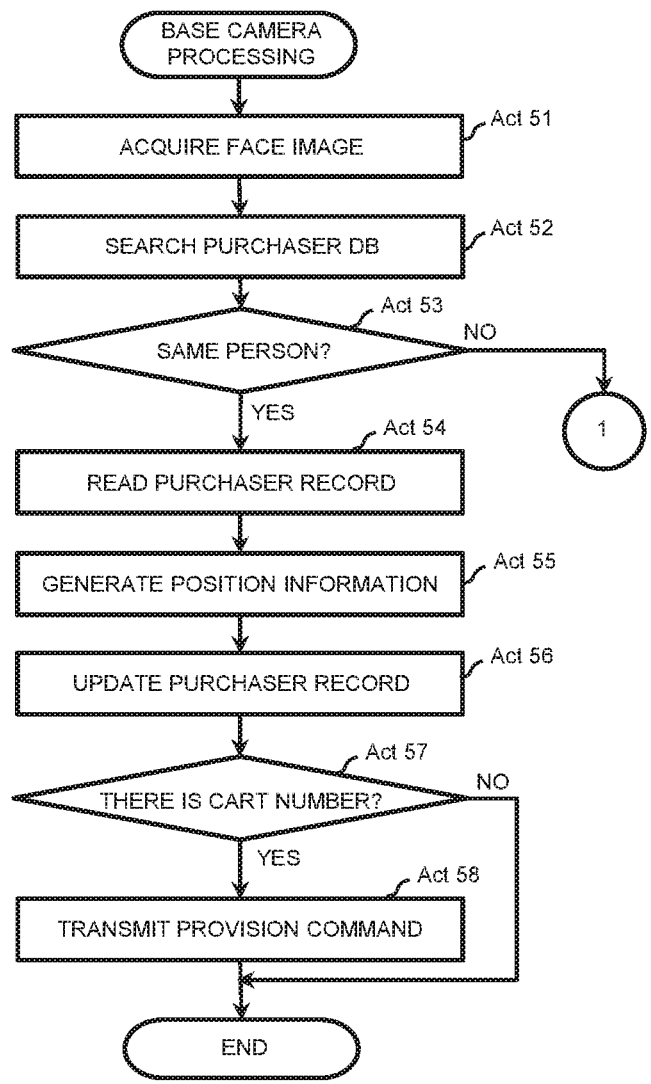
FIG. 13 is a flowchart showing a specific example of base camera processing shown in FIG. 10.

FIG. 13 is a flowchart specifically showing the base camera processing. As described above, the base camera CA3 photographs a face image of the purchaser who has come to the sales floor base. Therefore, the face image included in the photographing data D1 generated from the image obtained by photographing by the base camera CA3 is a face image of the purchaser who has come to the sale floor base.

When the processor 71 starts the base camera processing, the processor 71 acquires the face image from the photographing data D1 (refer to FIG. 8) in Act51. Then, in Act52, the processor 71 searches the purchaser database 92. That is, the processor 71 searches the purchaser database 92 for the acquired face image to be the search target data. Specifically, for example, the processor 71 sequentially compares the face image to be the search target data and the face image of the purchaser record 92R in which an accounting flag is not set to "1". Then, in Act53, the processor 71 finds the purchaser record 92R including a face image having a similarity that can be identified as the same person as the person of the face image to be the search target data. When the processor 71 finds the corresponding purchaser record 92R (YES in Act53), the processing of the processor 71 proceeds to processing of Act54. That is, when the processor 71 confirms that the purchaser record 92R including the face image having the similarity that can be identified as the same person as the person of the face image acquired in Act51 is stored in the purchaser database 92, the processing of the processor 71 proceeds to the processing of Act54. In Act54, the processor reads the corresponding purchaser record 92R as the purchaser record 92R to be an update target, from the purchaser database 92.

In Act55, the processor 71 generates position information from the photographing time and the in-store coordinates included in the photographing data D1 (refer to FIG. 8). Then, in Act56, the processor 71 describes the position information generated in Act55 in the purchaser record 92R to be the update target. After describing the position information, the processor 71 overwrites and stores the purchaser record 92R in the purchaser database 92. At this time, when the position information is already described in the purchaser record 92R, instead of the position information, the position information generated in Act55 is described.

In Act57, the processor 71 confirms whether or not the cart number is described in the purchaser record 92R to be the update target. When the processor 71 confirms that the cart number is not described (NO in Act57), the processor 71 ends the base camera processing.

When the processor 71 confirms that the cart number is described in the purchaser record 92R to be the update target (YES in Act57), the processing of the processor 71 proceeds to processing of Act58. In Act58, the processor 71 controls the communication interface 75 so as to transmit the provision command to the provision server 80. By this control, the communication interface 75 transmits the provision command to the provision server 80 via the network 2. The provision command includes each data of the position information, the purchaser attribute, and the cart number described in the purchaser record 92R to be the update target. In this way, the processor 71 ends the base camera processing.

As described above, if the purchaser moves to the position to be the base, the face image of the purchaser is photographed by the base camera CA3 provided at the base. If the face image of the purchaser is photographed by the base camera CA3, position information where the in-store coordinates and the current date and time for the base camera CA3 have been associated is described in the purchaser record 92R including the face image of the purchaser. That is, if the face image of the purchaser is photographed by the base camera CA3, the position information where the in-store coordinates and the current date and time for the base camera CA3 have been associated is described in the purchaser record 92R to which the purchaser ID unique to the purchaser has been set. Then, the provision command including the purchaser attribute and the cart number described in the purchaser record 92R together with the position information is transmitted to the provision server 80.

Incidentally, in Act53, when the processor 71 does not find the purchaser record 92R storing the face image having the similarity that can be identified as the same person as the person of the face image to be the search target data (No in Act53), the processing of the processor 71 proceeds to the processing of Act34 of the store entrance camera processing shown in FIG. 11. That is, when the processor 71 confirms that the purchaser record 92R storing the face image having the similarity that can be identified as the same person as the face image acquired in Act51 is not stored in the purchaser database 92, the processing of the processor 71 proceeds to the processing of Act34 of the store entrance camera processing shown in FIG. 11. Then, the processor 71 executes the processing of Act34 to Act39 as described above.

Therefore, a purchaser who has not been photographed by the store entrance camera CA2 or the cart camera CA1 moves to the base in the store, and a purchaser record 92R to which a purchaser ID unique to the purchaser has been set is generated. Then, the generated purchaser record 92R is stored in the purchaser database 92.

Description returns to the description of FIG. 10. When the processor 71 ends the base camera processing (Act28 in FIG. 10), the processor 71 ends the processing on the photographing data D1 received in Act21.

When the processor 71 confirms that the camera classification acquired from the photographing data D1 does not indicate the store entrance camera CA2, the cart camera CA1, and the base camera CA3 in Act27 (NO in Act27) the processing of the processor 71 proceeds to processing of Act29. In Act29, the processor 71 executes accounting camera processing. The accounting camera processing includes processing for setting "1" indicating that accounting has been performed to the accounting flag of the purchaser record 92R of the purchaser who performs accounting by the accounting machine 30 and updating the purchaser record 92R.

Figure 14:
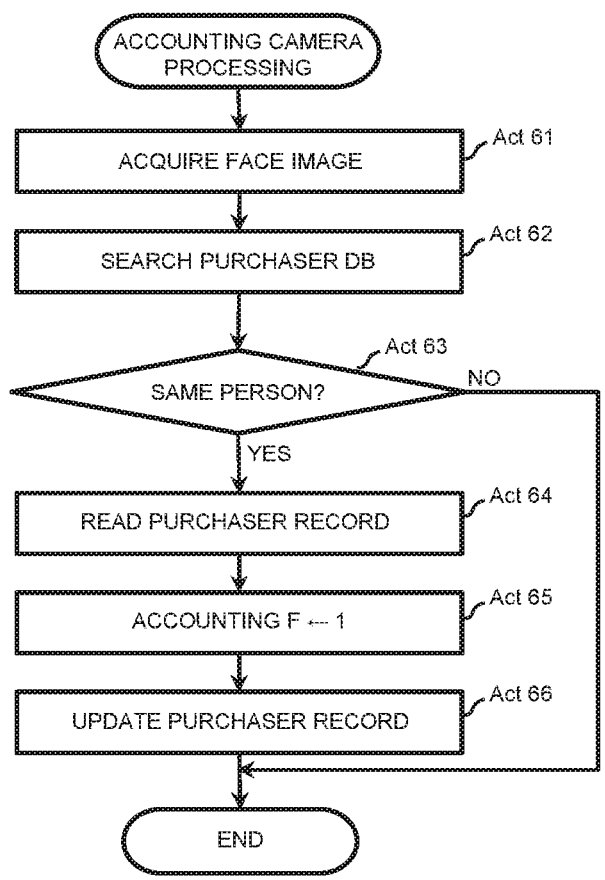
FIG. 14 is a flowchart showing a specific example of accounting camera processing shown in FIG. 10.
Figure 15:
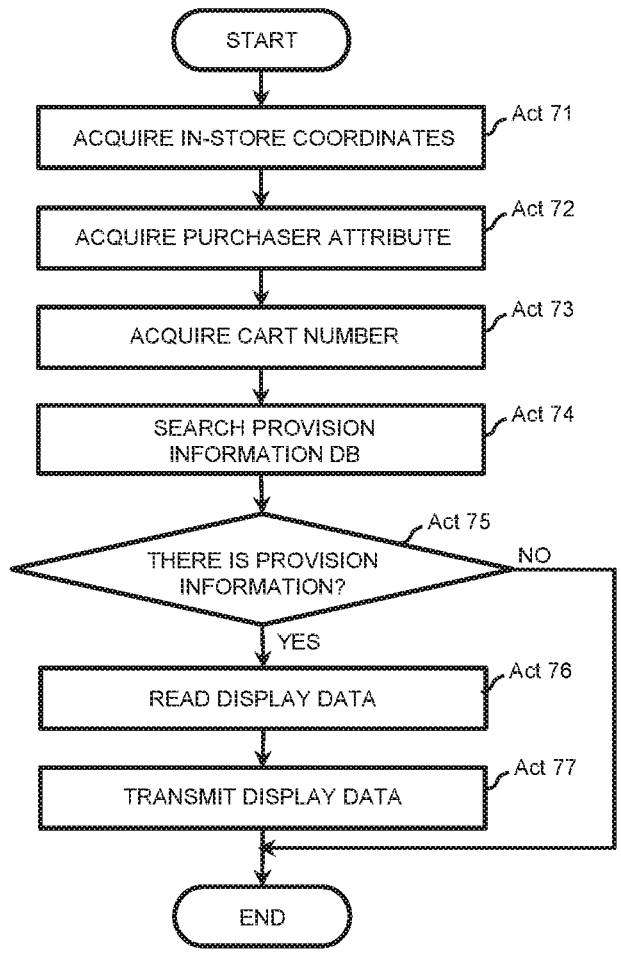
FIG. 15 is a flowchart showing information processing executed by a processor of a provision server according to a first embodiment, according to a control program.

FIG. 14 is a flowchart specifically showing a procedure of the accounting camera processing. As described above, the accounting camera CA4 photographs a face image of the purchaser who performs accounting by the accounting machine 30. Therefore, the face image included in the photographing data D1 generated from the image obtained by photographing by the accounting camera CA4 is the face image of the purchaser who performs accounting by the accounting machine 30.

When the processor 71 starts the accounting camera processing, in Act61, the processor 71 acquires the face image from the photographing data D1. Then, in Act62, the processor 71 searches the purchaser database 92. That is, the processor 71 searches the purchaser database 92 for the acquired face image to be the search target data. Specifically, for example, the processor 71 sequentially compares the face image to be the search target data and the face image of the purchaser record 92R in which an accounting flag is not set to "1". Then, in Act63, the processor 71 finds the purchaser record 92R storing the face image having the similarity that can be identified as the same person as the person of the face image to be the search target data. When the processor 71 finds the corresponding purchaser record 92R (YES in Act63), the processing of the processor 71 proceeds to processing of Act64. That is, when the processor 71 confirms that the purchaser record 92R storing the face image having the similarity that can be identified as the same person as the person of the face image acquired in Act61 is stored in the purchaser database 92, the processing of the processor 71 proceeds to the processing of Act64. In Act64, the processor 71 reads the corresponding purchaser record 92R as the purchaser record to be the update target, from the purchaser database 92.

In Act65, the processor 71 sets the accounting flag of the purchaser record 92R to "1". Then, in Act66, the processor 71 overwrites and stores the purchaser record 92R to be the update target in the purchaser database 92. In this way, the processor 71 ends the accounting camera processing.

As described above, if the purchaser is photographed by the accounting camera CA4, the accounting flag F of the purchaser record 92R to which the purchaser ID unique to the purchaser has been set is updated from "0" to "1". Therefore, thereafter, the purchaser record 92R is excluded from the search target in the cart camera processing, the base camera processing, and the accounting camera processing described above.

In Act63, when the processor 71 does not find the purchaser record 92R storing the face image having the similarity that can be identified as the same person as the person of the face image to be the search target data (NO in Act63), the processor 71 ends the accounting camera processing. That is, when the processor 71 confirms that the purchaser record 92R storing the face image having the similarity that can be identified as the same person as the person of the face image acquired in Act61 is not stored in the purchaser database 92, the processor 71 ends the accounting camera processing.

Description returns to the description of FIG. 10. When the processor 71 ends the accounting camera processing (Act29 in FIG. 10), the processor 71 ends the processing on the photographing data D1 received in Act21.

Next, an operation of the provision server 80 will be described using FIG. 15. When the processor 81 of the provision server 80 receives the provision command from the purchaser server 70 via the communication interface 85 (refer to Act58 of FIG. 13), the processor 81 starts the information processing shown in the flowchart of FIG. 15. That is, in Act71, the processor 81 acquires the in-store coordinates of the position information included in the provision command. Further, in Act72, the processor 81 acquires the purchaser attribute included in the provision command. Further, in Act73, the processor 81 acquires the cart number included in the provision command.

In Act74, the processor 81 searches the provision information database 93. That is, the processor 81 searches the provision information database 93 for the in-store coordinates acquired from the provision command and the purchaser attribute to be the search target data. In Act75, the processor 81 determines whether or not the provision information record 93R (refer to FIG. 4) including the in-store coordinates to be the search target data as the base coordinates and including the purchaser attribute matched with the purchaser attribute to be the search target data exists in the provision information database 93. When the corresponding provision information record 93R is not stored in the provision information database 93 (NO in Act75), the processor 81 ends this processing.

When the processor 81 determines that the corresponding provision information record 93R is stored in the provision information database 93 (YES in Act75), the processing of the processor 81 proceeds to processing of Act76. In Act76, the processor 81 reads display data from the corresponding provision information record 93R (refer to FIG. 4). Then, in Act77, the processor 81 controls the communication interface so as to transmit the display data to the information terminal 10 provided in the cart SC identified by the cart number acquired by the processing of Act73. That is, the processor 81 controls the communication interface 85 so as to transmit the display data to the information terminal 10 identified by the cart number. By this control, the communication interface 85 transmits communication data including the cart number and the display data to the corresponding information terminal 10. That is, the communication data is sent to the access point 20 via the network 2 and is wirelessly transmitted from the access point 20 to the corresponding information terminal 10. In this way, the processor 81 ends the processing when the provision command is received from the purchaser server 70.

The communication data wirelessly transmitted from the access point 20 is received by the information terminal 10. The processor 11 of the information terminal 10 having received the communication data via the wireless unit 14 confirms whether or not the cart number included in the communication data is matched with the cart number stored in the auxiliary storage device 13. Then, when the processor 11 confirms that both the cart numbers are not matched, the processor 11 discards the communication data. When the processor 11 confirms that both the cart numbers are matched, the processor 11 displays display data included in the communication data on the touch panel 15.

As described above, when the purchaser moves to the position to be the base, it is determined whether or not information including the purchaser attribute exists in information to be provided to the purchaser set with respect to the base. When the information including the purchaser attribute exists, the information is displayed on the touch panel 15 of the information terminal 10 provided in the cart SC operated by the purchaser.

For example, when the purchaser comes in front of the product shelf on which the bargains have been displayed, an image for introducing the bargains that are estimated to increase purchase desire in the case of the gender or the age of the purchaser is displayed on the touch panel 15. For example, when the purchaser comes in front of the product shelf on which products to be ingredients of a recommended recipe have been displayed, an image for introducing the recipe that is estimated to increase appetite in the case of the gender or the age of the purchaser is displayed on the touch panel 15.

Conversely, when there is no bargain that is estimated to increase purchase desire in the case of the gender or the age of the purchaser even if the purchaser comes in front of the product shelf on which the bargains have been displayed, an image is not displayed on the touch panel 15. Similarly, when there is no recipe that is estimated to increase appetite in the case of the gender or the age of the purchaser even if the purchaser comes in front of the product shelf on which the products to be the ingredients of the recommended recipe have been displayed, an image is not displayed on the touch panel 15.

Here, in the purchaser server 70, a computer mainly including the processor 71 executes the processing of Act34 to Act39 of FIG. 11. As a result, the purchaser server 70 (processor 71) functions as a person identification mechanism for identifying, from the image obtained by photographing by the store entrance camera CA2, the cart camera CA1, or the base camera CA3, the purchaser whose face is projected on the image.

Further, in the purchaser server 70, the computer mainly including the processor 71 executes the processing of Act35 of FIG. 11. As a result, the purchaser server 70 (processor 71) functions as an attribute determination mechanism for determining the attribute such as the gender and the age of the purchaser.

Further, in the purchaser server 70, the computer mainly including the processor 71 executes the processing of Act41 to Act48 of FIG. 12. As a result, the purchaser server 70 (processor 71) functions as an association mechanism for associating the face image of the purchaser operating the cart SC and the information terminal 10 provided in the cart SC, from the image obtained by photographing by the cart camera CA1.

On the other hand, in the provision server 80, a computer mainly including the processor 81 executes the processing of Act71 of FIG. 15. As a result, the provision server 80 (processor 81) functions as a place identification mechanism for identifying a place from the information of the base camera CA3 on which the face of the purchaser has been projected.

Further, in the provision server 80, the computer mainly including the processor 81 executes the processing of Act73 of FIG. 15. As a result, the provision server 80 (processor 81) functions as a terminal identification mechanism for identifying the information terminal 10 used by the purchaser. Specifically, the provision server 80 (processor 81) identifies the information terminal 10 associated with the face image of the purchaser identified by the person identification mechanism (Act34 to Act39 of FIG. 11).

Further, in the provision server 80, the computer mainly including the processor 81 executes the processing of Act74 to Act77 of FIG. 15. As a result, the provision server 80 (processor 81) functions as a provision mechanism for providing information according to the place to the information terminal 10. Further, in the provision server 80, the computer mainly including the processor 81 executes the processing of Act74 to Act77 including the processing of Act72. As a result, the provision server 80 (processor 81) functions as a provision mechanism for providing information according to the attribute of the purchaser and the place.

Therefore, in the present embodiment, the information provision device is configured by the purchaser server 70 managing the purchaser database 92 and the provision server 80 managing the provision information database 93. The information provision device may be configured to include the image processing server 60 for managing the camera database 91. The information provision device can be configured by one server instead of a plurality of servers.

As apparent from the above description, according to the present embodiment, it is possible to provide the information related to the place where the purchaser is located via the information terminal 10 used by the purchaser, without tracking the behavior of the purchaser. Further, since it is not necessary to track the behavior of the purchaser, it is possible to eliminate the use of wireless positioning technology such as GPS and beacons.

Further, according to the present embodiment, it is possible to selectively provide information regarding the attribute such as the gender and the age of the purchaser, so that it is possible to further increase the purchase desire of the purchaser and to appropriately provide information capable of being accepted by the purchaser.

Further, the information is provided from the information terminal 10 provided in the cart SC used by the purchaser. For this reason, it is not necessary for the purchaser to operate a terminal such as a smart phone to obtain the information. Therefore, according to the present embodiment, it is possible to achieve an effect of providing appropriate information without laying a burden on the purchaser.

In the first embodiment, the case where the purchaser is regarded as one person, and when the purchaser moves to the base, information regarding the base is provided to the purchaser has been exemplified. However, the purchasers also include purchasers who come to the store in a group, like being accompanied by children, married couples, friends, and the like.

Second Embodiment

Therefore, when someone in the group of the purchasers who have come to the store in the group moves to the base, an information provision device according to a second embodiment displays information regarding the base on the information terminal 10 of the cart SC used by the group. Hereinafter, the second embodiment will be described using FIG. 16.

Figure 16:
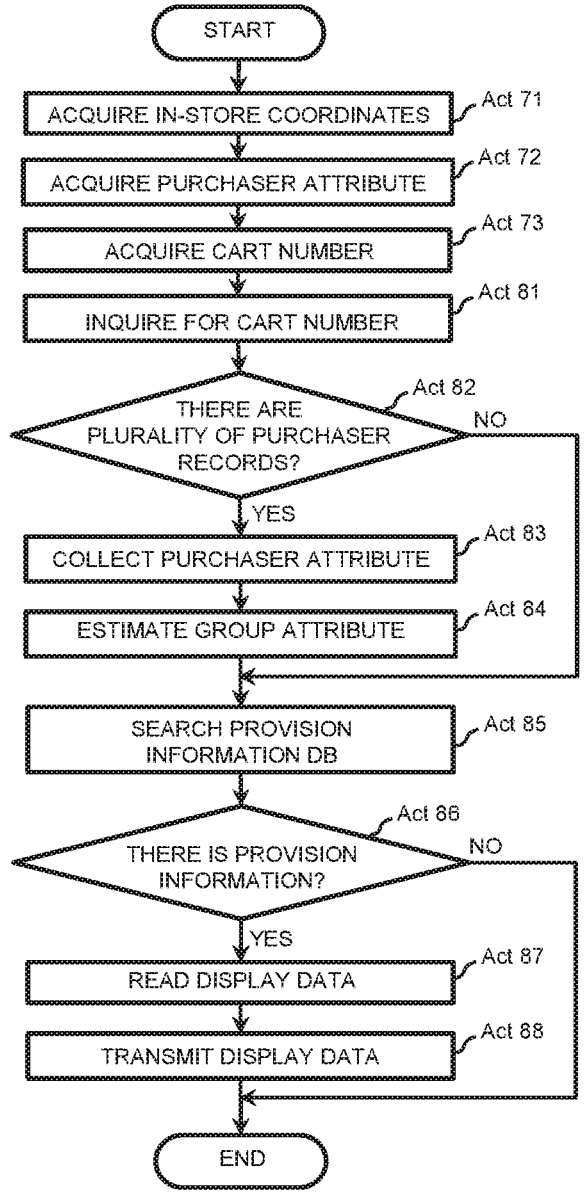
FIG. 16 is a flowchart showing information processing executed by a processor of a provision server according to a second embodiment, according to a control program.

FIG. 16 is a flowchart showing information processing executed by the processor 81 of the provision server 80 receiving the provision command via the communication interface 85. This information processing corresponds to the processing shown by the flowchart of FIG. 15 in the first embodiment. Therefore, the processing common to that in the first embodiment is denoted by the same reference numerals as those in FIG. 15, and the detailed description is omitted. Further, the information provision device according to the second embodiment has a configuration common to the configuration described using FIGS. 1 to 14 in the first embodiment. Therefore, in the following description, the description of FIGS. 1 to 14 is omitted.

When the processor 81 of the provision server 80 receives the provision command via the communication interface 85, the processor 81 starts the information processing shown in the flowchart of FIG. 16. That is, the processor 81 acquires the in-store coordinates of the position information, the purchaser attribute, and the cart number from the provision command, in Act71 to Act73.

Next, in Act81, the processor 81 controls the communication interface 85 to output a cart number inquiry command to the purchaser server 70. By this control, the communication interface 85 transmits the cart number inquiry command to the purchaser server 70 via the network 2. The inquiry command includes the cart number acquired from the provision command.

The processor 71 of the purchaser server 70 that has received the inquiry command searches the purchaser database 92 for the cart number included in the inquiry command to be the search target data, as the search data. Then, the processor 71 extracts all the purchaser records 92R including the cart number to be the search target data from the purchaser records 92R in which the accounting flag is not set to "1". The processor 71 controls the communication interface 75 to transmit the purchaser record 92R extracted from the purchaser database 92 to the provision server 80. By this control, the communication interface 75 transmits the purchaser record 92R extracted from the purchaser database 92 to the provision server 80 via the network 2.

As described in the first embodiment, when the face image of the purchaser is acquired from the image obtained by photographing by the cart camera CA1, the cart number of the cart SC provided with the cart camera CA1 is described in the purchaser record 92R to which the purchaser ID of the purchaser has been set. When the purchasers are the group, one cart SC is usually shared by members of the group. Therefore, there is a high possibility that a plurality of members in the group is photographed by the cart camera CA1. When the plurality of members is photographed by one cart camera CA1, the same cart number is described in the purchaser record 92R of each member. As a result, in response to the inquiry of the cart number from the provision server 80, a plurality of purchaser records 92R is transmitted from the purchaser server 70.

Therefore, in Act81, the processor 81 of the provision server 80 inquires for the cart number. Then, after inquiring for the cart number, in Act82, it is confirmed whether or not the plurality of purchaser records 92R has been received. When the processor 81 confirms that the plurality of purchaser records 92R has been received (YES in Act82), the processing of the processor 81 proceeds to processing of Act83. In Act83, the processor 81 collects purchaser attributes from the plurality of purchaser records 92R. Then, in Act84, the processor 81 estimates a group attribute from the plurality of purchaser attributes.

For example, when one of the two purchaser attributes is male and the other is female and ages of both the purchasers are close, the processor 81 estimates the purchaser group as a married couple or a couple. For example, when the two purchaser attributes are the same genders and the ages of the two purchasers are close, the processor 81 estimates the purchaser group as friends. For example, when one of the three purchaser attributes is male, another one is female, the ages of the two purchasers are close, and the age of the remaining one purchaser attribute is a child, the processor 81 estimates the purchaser group as being accompanied by a family.

After the estimation of the group attribute, in Act85, the processor 81 searches the provision information database 93. That is, the processor 81 searches the provision information database 93 for the in-store coordinates acquired from the provision command to be the search target data and the group attribute estimated by the processing of Act84. In this case, the provision information database 93 includes the provision information record 93R in which the group attribute is described, instead of the purchaser attribute. In Act86, the processor 81 determines whether or not the provision information record 93R including the in-store coordinates to be the search target data as the base coordinates and including a group attribute matched with the group attribute to be the search target data exists in the provision information database 93. When the processor 81 determines that the corresponding provision information record 93R is not stored in the provision information database 93 (NO in Act86), the processor 81 ends the processing (processing shown in FIG. 16).

Further, when the processor 81 determines that the corresponding provision information record 93R is stored in the provision information database 93 (YES in Act86), the processing of the processor 81 proceeds to processing of Act87. In Act87, the processor 81 reads display data from the corresponding provision information record 93R. Then, in Act88, the processor 81 controls the communication interface 85 so as to transmit the display data to the information terminal 10 provided in the cart SC identified by the cart number acquired in the processing of Act73. That is, the processor 81 controls the communication interface 85 so as to transmit the display data to the information terminal 10 identified by the cart number. By this control, the communication interface 85 transmits communication data including the cart number and the display data to the corresponding information terminal 10. That is, the communication data is sent to the access point 20 via the network 2 and is wirelessly transmitted from the access point 20 to the corresponding information terminal 10.

After inquiring for the cart number (Act81), when the processor 81 confirms that the number of received purchaser records 92R is only one (NO in Act82), the processing of the processor 81 proceeds to processing of Act85. Then, the processor 81 executes the same processing as the processing of Act74 to Act77 described in the first embodiment, in Act85 to Act88. In this way, the processor 81 ends the processing when the provision command is received.

Here, in the provision server 80, a computer mainly including the processor 81 executes the processing of Act81 to Act84 of FIG. 16. As a result, the provision server 80 (processor 81) functions as estimation mechanism for estimating the group configuration from the attributes of the plurality of purchasers, when the face images of the plurality of purchasers are associated with the same information terminal 10 by the association mechanism.

According to the second embodiment, in the case where the purchasers are the group, when someone in the group moves to the base, the information regarding the base can be displayed on the information terminal 10 of the cart SC used by the group. In that case, for example, when the purchaser group is being accompanied by the family, information suitable for being accompanied by the family can be displayed. For example, when the purchaser group is the couple, information suitable for the couple can be displayed.

Incidentally, the accounting flag of the purchaser record 92R is not set to "1" unless the purchaser identified by the purchaser record 92R is photographed by the accounting camera CA4. On the other hand, when the purchasers are the group, accounting may be performed by a person and the other members of the purchaser group may not approach the accounting machine 30. In this case, in the purchaser record 92R of the member who has not approached the accounting machine 30, the accounting flag is not set to "1" even if the accounting is completed.

Therefore, for example, the accounting flag is automatically set to "1" for the purchaser record 92R of the purchaser who is estimated to complete accounting, after a constant time elapses from the store entrance time. By adopting the above processing, it is possible to prevent the purchaser record 92R of the purchaser who has completed accounting from becoming the search target data.

In this regard, a camera similar to the accounting camera CA4 is provided at the entrance of the store. In addition, the accounting flag of the purchaser record 92R for the purchaser whose face has been photographed by the camera at the entrance may be set to "1". In this way, since the purchaser leaves the store and the accounting flag of the purchaser record 92R for the purchaser is set to "1", this is effective.

The embodiment of the information provision device that can provide the information related to the place where the person is located via the terminal used by the person, without tracking the behavior of the person, has been described. However, the embodiment is not limited thereto.

In the embodiment described above, the terminal used by the purchaser is used as the information terminal 10 provided in the cart SC. The terminal provided in the cart SC is not limited to the information terminal 10. For example, the face image of the purchaser and identification information of a communication terminal such as a smart phone carried and used by the purchaser are registered in advance. Then, the provision server 80 may acquire the identification information of the communication terminal registered for the face image obtained by photographing by the base camera CA3 and may provide information according to the base to the communication terminal identified by the identification information. In this case, the cart camera CA1 and the store entrance camera CA2 become unnecessary.

For example, in the second embodiment, the provision server 80 (processor 81) has the function as the estimation mechanism. The purchaser server 70 (processor 71) may have the function of the estimation mechanism. In that case, when the processor 71 of the purchaser server 70 detects the plurality of purchaser records 92R from the purchaser database 92, the processor 71 estimates the group attribute from the purchaser attribute of each purchaser record. In addition, the processor 71 of the purchaser server 70 may notify the provision server 80 of the group attribute.

In the embodiment described above, in the image processing server 60, the purchaser server 70, and the provision server 80, the control program is stored in advance in the main memory or the auxiliary storage device. In this regard, each server may be transferred in a state where the control program is not stored in the main memory or the auxiliary storage device. In that case, the control program transferred separately from the server is written to a writable storage device provided in each server, according to the operation of the user or the like. The control program can be transferred by recording the control program on a removable recording medium or performing communication via a network. As long as the program can be stored as in a CD-ROM, a memory card, and the like and the device is readable, the form of the recording medium is not limited.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information provision device comprising:
    a plurality of cameras that obtain images by photographing a predetermined photographing region including a person;
    a communication interface that communicates with the plurality of cameras and an information terminal used by the person;
    a storage device that stores a person database and an information provision database,
        the person database storing a person record for identifying the person included in the images obtained by the plurality of cameras and the information provision database previously storing an information record including provision information to be provided to the person according to position information indicating an installation position of a predetermined camera among the plurality of cameras; and
    a processor, wherein,
    when the image obtained by any camera among the plurality of cameras is received via the communication interface,
        the processor generates the person record including a face image of the person acquired on the basis of the received image and terminal identification information for identifying the information terminal used by the person acquired on the basis of the received image and stores the generated person record in the person database, and when the image obtained by the predetermined camera is received via the communication interface, the processor reads the person record including the face image of the person acquired on the basis of the received image from the person database, the processor reads the information record according to the position information indicating the installation position of the predetermined camera generated on the basis of the received image from the information provision database, and the processor transmits the provision information included in the read information record to the information terminal identified by the terminal identification information included in the read person record via the communication interface, the information provision database previously stores the information record including the provision information to be provided to the person, according to the position information indicating the installation position of the predetermined camera and attribute information indicating an attribute of the person, and when the image obtained by any camera among the plurality of cameras is received via the communication interface, the processor:
determines the attribute of the person on the basis of the received image, and
generates the person record including the attribute information indicating the determined attribute of the person and stores the generated person record in the person database, when the image obtained by the predetermined camera is received via the communication interface, the processor:
reads the person record including the face image of the person acquired on the basis of the received image from the person database,
acquires the terminal identification information and the attribute information included in the read person record,
reads the information record according to the position information indicating the installation position of the predetermined camera generated on the basis of the received image and the acquired attribute information from the information provision database, and
transmits the provision information included in the read information record to the information terminal identified by the acquired terminal identification information via the communication interface, the plurality of cameras includes a mobile camera that obtains an image by photographing a photographing region including a person who operates a mobile object including the information terminal, and when the image obtained by the mobile camera is received via the communication interface, the processor:
generates the person record including mobile object identification information for identifying the mobile object used by the person, acquired on the basis of the received image, as the terminal identification information, and stores the generated person record in the person database, and when the image obtained by the predetermined camera among the plurality of cameras is received via the communication interface, the processor:
reads the person record including the face image of the person acquired on the basis of the received image from the person database, acquires the mobile object identification information and the attribute information included in the read person record,
reads the information record according to the position information indicating the installation position of the predetermined camera generated on the basis of the received image and the acquired attribute information from the information provision database, and
transmits the provision information included in the read information record to the information terminal provided in the mobile object identified by the acquired mobile object identification information via the communication interface.

2. The information provision device according to claim 1, wherein, when the image obtained by the predetermined camera is received via the communication interface, the processor:
reads the person record including the face image of the person acquired on the basis of the received image from the person database,
generates the position information indicating the installation position of the predetermined camera on the basis of the received image,
includes the generated position information in the read person record to update the read person record,
reads the information record according to the position information included in the updated person record from the information provision database, and
transmits the provision information included in the read information record to the information terminal identified by the terminal identification information included in the read person record via the communication interface.

3. The information provision device according to claim 1, wherein
the plurality of cameras includes a mobile camera that obtains an image by photographing a photographing region including a person who uses a mobile object including the information terminal, and
when the image obtained by the mobile camera is received via the communication interface,
the processor generates the person record including mobile object identification information for identifying the mobile object used by the person, acquired on the basis of the received image, as the terminal identification information, and stores the generated person record in the person database.

4. The information provision device according to claim 3, wherein, when the image obtained by the predetermined camera is received via the communication interface,
the processor:
reads the person record including the face image of the person acquired on the basis of the received image from the person database,
acquires the mobile object identification information included in the read person record, and
reads the information record according to the position information indicating the installation position of the predetermined camera generated on the basis of the received image from the information provision database.

5. The information provision device according to claim 4, wherein, when the image obtained by the predetermined camera is received via the communication interface, the processor transmits the provision information included in the read information record to the information terminal provided in the mobile object identified by the acquired mobile object identification information via the communication interface.

6. An information provision device comprising:
a plurality of cameras that obtain images by photographing a predetermined photographing region including a person;
a communication interface that communicates with the plurality of cameras and an information terminal used by the person;
a storage device that stores a person database and an information provision database,
the person database storing a person record for identifying the person included in the images obtained by the plurality of cameras and the information provision database previously storing an information record including provision information to be provided to the person according to position information indicating an installation position of a predetermined camera among the plurality of cameras; and
a processor, wherein,
when the image obtained by any camera among the plurality of cameras is received via the communication interface,
the processor generates the person record including a face image of the person acquired on the basis of the received image and terminal identification information for identifying the information terminal used by the person acquired on the basis of the received image and stores the generated person record in the person database,
when the image obtained by the predetermined camera is received via the communication interface,
the processor reads the person record including the face image of the person acquired on the basis of the received image from the person database,
the processor reads the information record according to the position information indicating the installation position of the predetermined camera generated on the basis of the received image from the information provision database, and
the processor transmits the provision information included in the read information record to the information terminal identified by the terminal identification information included in the read person record via the communication interface,
the plurality of cameras includes a mobile camera that obtains an image by photographing a photographing region including a person who uses a mobile object including the information terminal,
the information provision database previously stores the information record including the provision information to be provided to the person according to the position information indicating the installation position of the predetermined camera and group attribute information indicating an attribute of a group including a plurality of persons,
when the image obtained by any camera among the plurality of cameras is received via the communication interface,
the processor:
determines an attribute of the person on the basis of the received image,
generates the position information indicating the installation position of any camera among the plurality of cameras on the basis of the received image,
acquires mobile object identification information for identifying the mobile object used by the person on the basis of the received image as the terminal identification information,
generates the person record including attribute information indicating the determined attribute of the person, the generated position information, and the acquired mobile object identification information, and stores the generated person record in the person database, and
when the image obtained by the predetermined camera is received via the communication interface,
the processor:
reads the person record including the face image of the person acquired on the basis of the received image from the person database,
acquires the mobile object identification information from the read person record,
determines whether or not a plurality of the person records including the acquired mobile object identification information is stored in the person database,
collects the attribute information from each of the plurality of person records when the plurality of person records is stored in the person database,
estimates the attribute of the group including the plurality of persons from the collected attribute information,
reads the information record according to the position information indicating the installation position of the predetermined camera generated on the basis of the received image and the group attribute information indicating the estimated attribute of the group, from the information provision database, and
transmits the provision information included in the read information record to the information terminal provided in the mobile object identified by the acquired mobile object identification information via the communication interface.

* * * * *